(12) United States Patent
Nishiguchi et al.

(10) Patent No.: US 8,222,992 B2
(45) Date of Patent: Jul. 17, 2012

(54) CONTROL SYSTEM AND METHOD, AND COMMUNICATION DEVICE AND METHOD

(75) Inventors: Tadao Nishiguchi, Nagoya (JP); Yutaka Yasuda, Utsunomiya (JP); Hideo Ebizawa, Kasugai (JP); Ryohei Tashiro, Kitanagoya (JP); Masato Kashiyama, Kasugai (JP)

(73) Assignee: OMRON Corporation, Kyoto (JP)

( * ) Notice: Subject to any disclaimer, the term of this patent is extended or adjusted under 35 U.S.C. 154(b) by 185 days.

(21) Appl. No.: 12/712,056

(22) Filed: Feb. 24, 2010

(65) Prior Publication Data

US 2010/0231354 A1 Sep. 16, 2010

(30) Foreign Application Priority Data

Mar. 13, 2009 (JP) ................................ P2009-060961

(51) Int. Cl.
*G05B 19/00* (2006.01)
*B60R 25/10* (2006.01)
*H04Q 5/22* (2006.01)
*G06F 19/00* (2011.01)
(52) U.S. Cl. ................. 340/5.63; 340/426.13; 340/10.2; 701/113; 701/36; 123/179.2
(58) Field of Classification Search ........................ None
See application file for complete search history.

(56) References Cited

U.S. PATENT DOCUMENTS 5,883,582 A * 3/1999 Bowers et al. ............... 340/10.2

(Continued)

FOREIGN PATENT DOCUMENTS

CN 101198758 A 6/2008

(Continued)

OTHER PUBLICATIONS

Office Action Issued in Chinese Application No. 201010001411.4, Dated Oct. 10, 2010 (6 Pages).

*Primary Examiner* — Jennifer Mehmood
*Assistant Examiner* — Fekadeselassie Girma
(74) *Attorney, Agent, or Firm* — Osha Liang LLP

(57) ABSTRACT

A control system has a control device for performing a control of a predetermined process, and a communication device for communicating with the control device. The control device has a first transmission unit for transmitting a request signal requesting for transmission of a response signal to the communication device, a first reception unit for receiving the response signal transmitted through a predetermined procedure from the communication device in response to the request signal transmitted by the first transmission unit, an authentication unit for performing authentication of the communication device using identification information of the communication device contained in the response signal received by the first reception unit and identification information of the communication device registered in advance, and a process executing unit for executing the predetermined process when the authentication of the communication device by the authentication unit is successful. The communication device has a first storage unit for storing transmission scheduled time information indicating a time scheduled to transmit the response signal assigned to the communication device, a second reception unit for receiving the request signal transmitted from the first transmission unit, and a second transmission unit for transmitting the response signal corresponding to the request signal received by the second reception unit to the control device at a time different from times assigned to other communication devices based on the transmission scheduled time information stored in the first storage unit.

14 Claims, 19 Drawing Sheets

U.S. PATENT DOCUMENTS

| | | | |
|---|---|---|---|
| 7,515,714 B2 * | 4/2009 | Orihashi et al. | 380/255 |
| 2002/0175806 A1 * | 11/2002 | Marneweck et al. | 340/10.33 |
| 2003/0179078 A1 * | 9/2003 | Chen et al. | 340/10.2 |
| 2007/0164876 A1 * | 7/2007 | Ostrander et al. | 340/825.72 |
| 2007/0224967 A1 * | 9/2007 | Kashiyama et al. | 455/410 |
| 2007/0268110 A1 * | 11/2007 | Little | 340/5.62 |
| 2009/0066477 A1 | 3/2009 | Kaihori et al. | |
| 2009/0224876 A1 * | 9/2009 | McCall et al. | 340/5.61 |
| 2010/0214112 A1 | 8/2010 | Ishihara et al. | |
| 2010/0231354 A1 * | 9/2010 | Nishiguchi et al. | 340/5.8 |

FOREIGN PATENT DOCUMENTS

| | | |
|---|---|---|
| JP | 2008-150835 A | 7/2008 |
| JP | 2008-150836 A | 7/2008 |
| WO | 2009014212 A1 | 1/2009 |

\* cited by examiner

FIG. 7
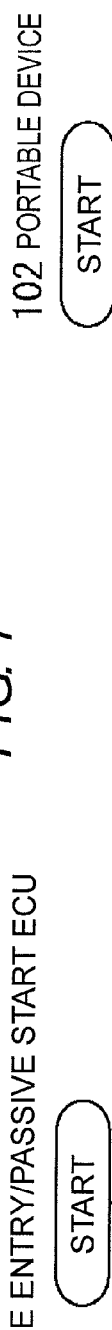

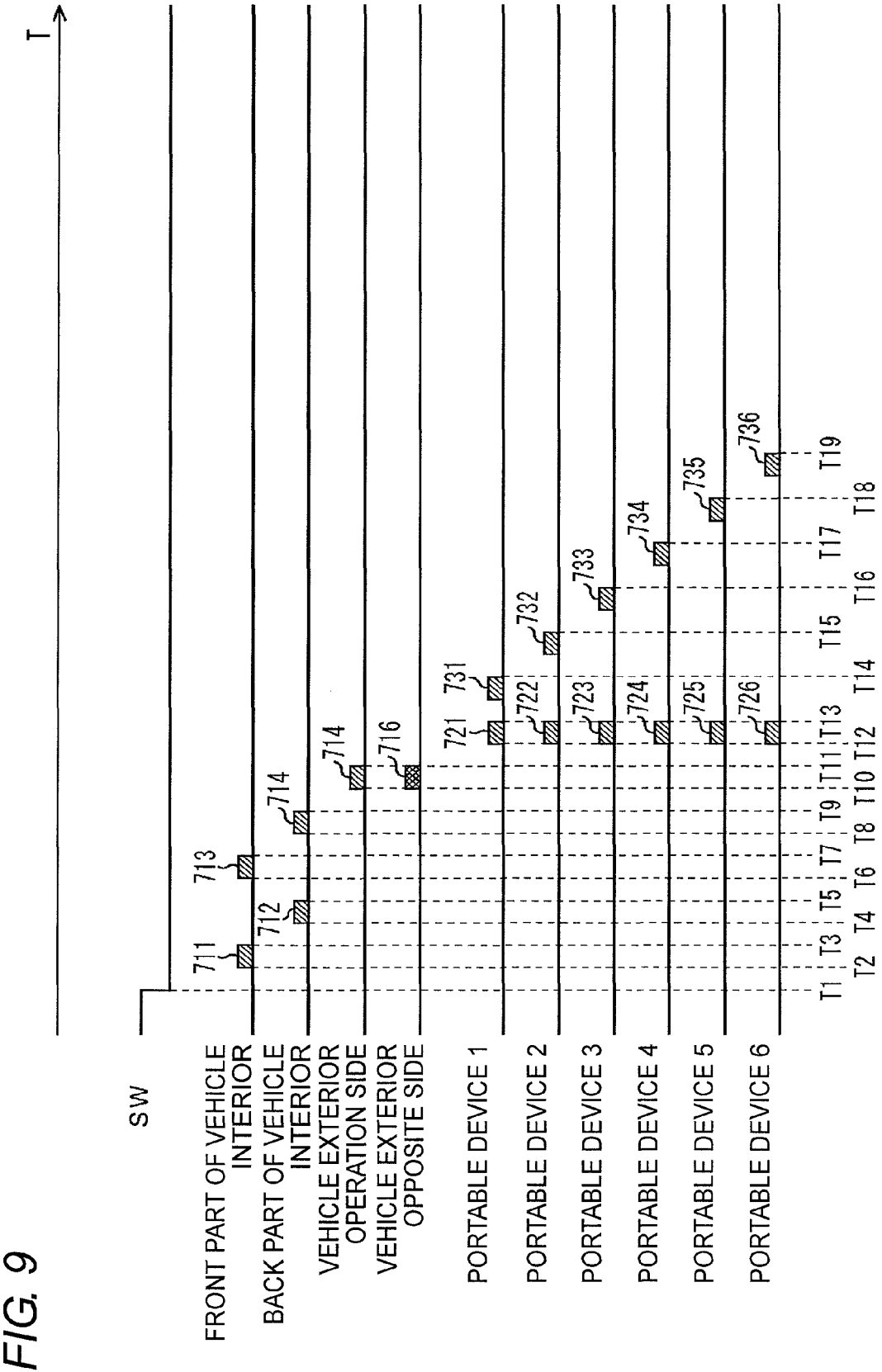

CONTROL SYSTEM AND METHOD, AND COMMUNICATION DEVICE AND METHOD

BACKGROUND OF THE INVENTION

1. Technical Field

The present invention relates to control systems and methods, as well as, communication devices and methods, and in particular, to a control system and method, as well as, a communication device and method that suppress occurrence of collision and enable communication to be carried out more efficiently and accurately.

2. Related Art

A system that controls locking and unlocking of the door, for example, based on a signal transmitted from a portable device having a wireless communication function is conventionally known. For example, there is known a control system that receives a signal transmitted from a portable device having a wireless communication function by an in-vehicle wireless device mounted on an automobile, authenticates identification information of the portable device contained in the signal, and performs a predetermined process such as locking and unlocking of the door of the automobile or startup of the engine of the automobile when the authentication is successful.

With such a control system, there can be realized a so-called passive entry/passive start of locking and unlocking the door of the automobile or startup of the engine of the automobile without requiring an operation of, for example, inserting a key to a key hole and turning the key as in prior art. Specifically, the user can easily lock and unlock the door of the automobile or start up the engine of the automobile by simply operating a door knob or an engine start button of the automobile with the portable device positioned within a communicable range of the in-vehicle wireless device (in a normal case, the state in which the portable device is simply carried around).

In such a control system, the portable device transmits a response signal with respect to a request signal to the in-vehicle wireless device when receiving the request signal from the in-vehicle wireless device to indicate that it is positioned within the communicable range of the in-vehicle wireless device. However, if a plurality of portable devices exists within the communicable range of the in-vehicle wireless device, each of portable devices transmits the response signal with respect to the request signal at the same timing, whereby collision occurs among the response signals, and the in-vehicle wireless device may not be able to correctly receive such response signals.

A method is considered in which the in-vehicle wireless device retransmits the request signal, which individually specifies the portable device, to the portable device at different timing from each other when collision of the response signals occurred (see e.g., Japanese Unexamined Patent Publication Nos. 2008-150835 and 2008-150836).

In this method, the in-vehicle wireless device transmits the request signal for the portable device at different timing from each other with the identification information of the portable device contained in the request signal when a predetermined instructing operation such as unlocking, locking, or engine startup is performed by the user. The timing at which the portable device receives the request signal with respect to each other is differed from each other by shifting the transmission timing of the request signal. The occurrence of collision of the response signals is suppressed since the transmission timing of the response signal of the portable device also differs from each other.

SUMMARY

However, in the case of the methods described in Japanese Unexamined Patent Publication Nos. 2008-150835 and 2008-150836, the in-vehicle wireless device has to transmit the request signal over a plurality of times (number of portable devices), and hence the load of the process of the in-vehicle wireless device may increase and the power consumption may increase as the number of portable devices increases.

In the case of the methods described in Japanese Unexamined Patent Publication Nos. 2008-150835 and 2008-150836, the in-vehicle wireless device performs the authentication of the portable device one by one. In other words, the in-vehicle wireless device transmits the request signal with respect to a certain portable device, performs the authentication of the portable device when receiving the response signal thereof, and performs the control process of locking and unlocking and the like when the authentication is successful. If the authentication fails or the response signal is not received, the in-vehicle wireless device performs a similar process on a next portable device. The in-vehicle wireless device repeats such a process until the authentication becomes successful. Therefore, transmission and reception of the request signal and the response signal are required for the authentication of one portable device, and hence the processing time until the authentication becomes successful may undesirably increase. The response time until the control operation from the instructing operation of the user increases if the processing time increases, and a so-called "state of late response" may occur, which gives an unpleasant feeling to the user.

Furthermore, in the case of the methods described in Japanese Unexamined Patent Publication Nos. 2008-150835 and 2008-150836, the possibility the communication will fail may increase since the number of communications increases. In particular, the time (so-called response time) until the authentication becomes successful may increase if the transmission and reception of the request signal and the response signal for every portable device fail.

One or more embodiments of the present invention suppresses the occurrence of collision among the response signals and enables the communication to be carried out more efficiently and accurately by causing the portable device to transmit the response signal at different timing from each other with respect to the reception timing of the request signal.

In accordance with one aspect of the present invention, a control system includes a control device for performing a control of a predetermined process, and a communication device for communicating with the control device. The control device includes a first transmission unit for transmitting a request signal requesting for transmission of a response signal to the communication device, a first reception unit for receiving the response signal transmitted through a predetermined procedure from the communication device in response to the request signal transmitted by the first transmission unit, an authentication unit for performing authentication of the communication device using identification information of the communication device contained in the response signal received by the first reception unit and identification information of the communication device registered in advance, and a process executing unit for executing the predetermined process when the authentication of the communication device by the authentication unit is successful. The communication device includes a first storage unit for storing transmission scheduled time information indicating a time scheduled to transmit the response signal assigned to the communication device, a second reception unit for receiving the request signal transmitted from the first transmission unit, and a second transmission unit for transmitting the response signal corresponding to the request signal received by the second reception unit to the control device at a time different from times assigned to other communication devices based on the transmission scheduled time information stored in the first storage unit.

In one aspect of the present invention, in the control device, the request signal requesting for transmission of the response signal is transmitted to the communication device, the response signal transmitted through a predetermined procedure by the communication device in response to the transmitted request signal is received, the authentication of the communication device is performed using the identification information of the communication device contained in the received response signal and the identification information of the communication device registered in advance, and a predetermined process is executed when the authentication of the communication device is successful; and in the communication device, the transmission scheduled time information indicating the time scheduled to transmit the response signal assigned to the communication device is stored, the request signal transmitted by the control device is received, and the response signal corresponding to the received request signal is transmitted to the control device at a time different from the times assigned to other communication devices based on the stored transmission scheduled time information.

Therefore, the occurrence of collision between the response signals transmitted by each of the communication devices with respect to the common request signal to all communication devices transmitted from the control device is suppressed, and the communication can be more efficiently and accurately carried out.

For example, the control device is configured by the in-vehicle system of the automobile or the passive entry/passive start ECU therein, the first transmission unit is configured by the request signal transmission part, the first reception unit is configured by the response signal reception part, the authentication unit is configured by the authentication part, and the process executing unit is configured by the process executing part. The request signal transmission part, the response signal reception part, the authentication part, and the process executing part are implemented by, for example, the control unit including the CPU and the like of the passive entry/passive start ECU.

The communication device is configured by the portable device registered in the in-vehicle system, the first storage unit is configured by the storage unit of the portable device, the second reception unit is configured by the request signal receiving portion, and the second transmission unit is configured by the response signal transmitting portion. The request signal receiving portion and the response signal transmitting portion are implemented by the control unit including the CPU and the like of the portable device. The transmission scheduled time information may be a fixed numerical value, or may be a series of programs for determining the transmission timing. The first storage unit may be a storage unit stored with the program of the CPU, or may be an EEPROM capable of storing the numerical values and the like to be used to represent a predetermined time.

The communication device further includes, a timing unit for performing a timing process of measuring time and specifying current time, and the second transmission unit may transmit the response signal after elapse of a predetermined time from when the request signal is received by the second reception unit based on the timing process by the timing unit.

Thus, the occurrence of collision between the response signals transmitted by each of the communication devices with respect to the common request signal to all communication devices transmitted from the control device is suppressed, and the communication can be more efficiently and accurately carried out.

The timing unit is configured by a timing part implemented in the control unit including the CPU and the like of the portable device.

The second transmission unit may perform a first transmission of the response signal at a time common with the other communication devices, and perform a second transmission of the response signal at a time different from the times assigned to the other communication devices based on the transmission scheduled time information stored in the first storage unit.

Thus, the control device can receive the response signal faster, and can execute the predetermined processes faster.

The second transmission unit may perform transmission of the response signal twice at a time different from the times assigned to the other communication devices based on the transmission scheduled time information stored in the first storage unit.

The control device thus can more reliably receive the response signal.

The second transmission unit may perform a first transmission of the response signal at a time corresponding to the request signal received by the second reception unit of a plurality of times common with the other communication devices, and perform a second transmission of the response signal at a time different from the times assigned to the other communication devices based on the transmission scheduled time information stored in the first storage unit.

Thus, the control device can receive the response signal faster, and can execute the predetermined processes faster.

The communication device may further include a time setting unit for setting a time for the second transmission unit to transmit the response signal based on the transmission scheduled time information stored in the first storage unit and information indicating priority in the transmission of the response signal contained in the request signal received by the second reception unit.

Thus, the production of an unnecessary waiting time from when the communication device receives the request signal until transmitting the response signal can be suppressed.

The time setting unit is configured by a time setting unit implemented in the control unit including the CPU and the like of the portable device.

The first reception unit may receive the response signal for a predetermined period including all times scheduled to transmit the response signal assigned to each of the communication devices.

Therefore, the occurrence of collision between the response signals transmitted by each of the communication devices with respect to the common request signal to all communication devices transmitted from the control device is suppressed, and the communication can be more efficiently and accurately carried out.

The control device may further include an invalid setting unit for performing an invalid setting of invalidating other response signals received in the predetermined period when authentication of the communication device by the authentication unit, which is a transmission source of the response signal received first by the first reception unit, is successful.

Thus, the same process is prevented from being repeatedly executed with respect to one request.

The invalid setting unit is configured by an invalid setting part implemented in the control unit including the CPU and the like of the passive entry/passive start ECU.

The control device may further include a priority determining unit for determining a priority in the transmission of the response signal of each of the communication devices based on the reception result of the response signal by the first reception unit, and a second storage unit for storing the priority determined by the priority determining unit. The first transmission unit may transmit the request signal including the priority stored in the second storage unit.

Thus, the production of an unnecessary waiting time from when the communication device receives the request signal until transmitting the response signal can be suppressed.

The priority determining unit is configured by the priority setting part implemented in the control unit including the CPU and the like of the passive entry/passive start ECU. The second storage unit is configured by the storage unit of the passive entry/passive start ECU.

In accordance with another aspect of the present invention, there is provided a method of controlling a control system including a control device for performing a control of a predetermined process, and a communication device for communicating with the control device. The control device performs the steps of transmitting a request signal requesting for transmission of a response signal to the communication device, receiving the response signal transmitted through a predetermined procedure from the communication device in response to the transmitted request signal, performing authentication of the communication device using identification information of the communication device contained in the received response signal and identification information of the communication device registered in advance, and executing the predetermined process when the authentication of the communication device is successful. The communication device performs the steps of receiving the request signal transmitted by the control device, and transmitting the response signal corresponding to the received request signal to the control device at a time different from times assigned to other communication devices based on transmission scheduled time information indicating a time scheduled to transmit the response signal assigned to the communication device.

Therefore, the occurrence of collision between the response signals transmitted by each of the communication devices with respect to the common request signal to all communication devices transmitted from the control device is suppressed, and the communication can be more efficiently and accurately carried out.

In accordance with still another aspect of the present invention, a communication device for communicating with a control device performs a control of a predetermined process. The communication device includes a storage unit for storing transmission scheduled time information indicating a time scheduled to transmit a response signal corresponding to a request signal transmitted by the control device assigned to the communication device itself, a reception unit for receiving the request signal transmitted by the control device, and a transmission unit for transmitting the response signal corresponding to the request signal received by the reception unit to the control device at a time different from times assigned to other communication devices based on the transmission scheduled time information stored in the storage unit.

In one aspect of the present invention, the transmission scheduled time information indicating the time scheduled to transmit the response signal corresponding to the request signal transmitted from the control device assigned to the communication device itself is stored, the request signal transmitted by the control device is received, and the response signal corresponding to the received request signal is transmitted to the control device at a time different from the time assigned to other communication devices based on the stored transmission scheduled time information.

Therefore, the occurrence of collision between the response signals transmitted by each of the communication devices with respect to the common request signal to all communication devices transmitted from the control device is suppressed, and the communication can be more efficiently and accurately carried out.

The communication device is configured by the portable device registered in the in-vehicle system of the automobile, the storage unit is configured by the storage unit of the portable device, the reception unit is configured by the request signal receiving portion, and the transmission unit is configured by the response signal transmitting portion. The request signal receiving portion and the response signal transmitting portion are implemented by the control unit including the CPU and the like of the portable device.

The control device is configured by the in-vehicle system of the automobile or the passive entry/passive start ECU therein. The transmission scheduled time information may be a fixed numerical value, or may be a series of programs for determining the transmission timing. The storage unit may be a storage unit stored with the program of the CPU, or may be an EEPROM capable of storing the numerical values and the like to be used to represent a predetermined time.

The communication device may further include a timing unit for performing a timing process of measuring time and specifying current time, and the transmission unit may transmit the response signal after elapse of a predetermined time from when the request signal is received by the reception unit based on the timing process by the timing unit.

Thus, the occurrence of collision between the response signals transmitted by each of the communication devices with respect to the common request signal to all communication devices transmitted from the control device is suppressed, and the communication can be more efficiently and accurately carried out.

The timing unit is configured by a timing part implemented in the control unit including the CPU and the like of the portable device.

The transmission unit may perform a first transmission of the response signal at a time common with the other communication devices, and perform a second transmission of the response signal at a time different from the times assigned to the other communication devices based on the transmission scheduled time information stored in the storage unit.

Thus, the control device can receive the response signal faster, and can execute the predetermined processes faster.

The transmission unit may perform transmission of the response signal twice at a time different from the times assigned to the other communication devices based on the transmission scheduled time information stored in the storage unit.

The control device thus can more reliably receive the response signal.

The transmission unit may perform a first transmission of the response signal at a time corresponding to the request signal received by the reception unit of a plurality of times common with the other communication devices, and perform a second transmission of the response signal at a time different from the times assigned to the other communication devices based on the transmission scheduled time information stored in the storage unit.

Thus, the control device can receive the response signal faster, and can execute the predetermined processes faster.

The communication device may further include a time setting unit for setting a time for the transmission unit to transmit the response signal based on the transmission scheduled time information stored in the storage unit and information indicating priority in the transmission of the response signal contained in the request signal received by the reception unit.

Thus, the production of an unnecessary waiting time from when the communication device receives the request signal until transmitting the response signal can be suppressed.

The time setting unit is configured by a time setting unit implemented in the control unit including the CPU and the like of the portable device.

In accordance with yet another aspect of the present invention, there is provided a communication method of a communication device for communicating with a control device that performs a control of a predetermined process, comprising the steps of receiving the request signal transmitted by the control device, and transmitting the response signal corresponding to the received request signal to the control device at a time different from times assigned to other communication devices based on transmission scheduled time information indicating a time scheduled to transmit the response signal corresponding to the request signal transmitted by the control device assigned to the communication device itself.

Therefore, the occurrence of collision between the response signals transmitted by each of the communication devices with respect to the common request signal to all communication devices transmitted from the control device is suppressed, and the communication can be more efficiently and accurately carried out.

According to one or more embodiments of the present invention, the information can be processed. In particular, the communication can be more efficiently and accurately carried out.

BRIEF DESCRIPTION OF THE DRAWINGS

FIG. 7 is a flowchart describing an example of a flow of process of an entire control system;

FIG. 9 is a diagram describing an example of transmission and reception timing of the request signal and the response signal;

DETAILED DESCRIPTION

Figure 1:
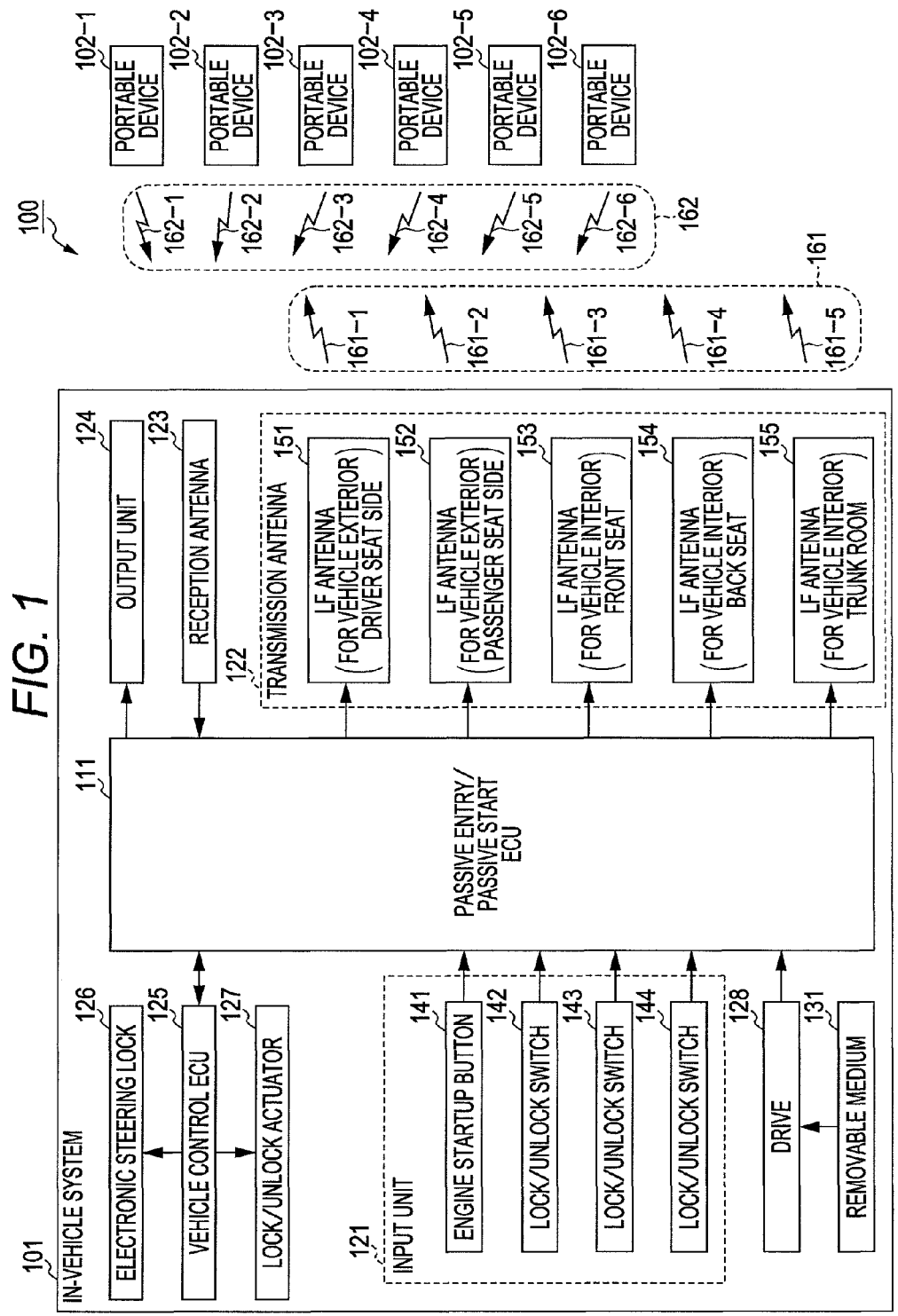
FIG. 1 is a diagram showing a main configuration example of a control system applied with one or more embodiments of the present invention.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a diagram showing a main configuration example of a control system applied with one or more embodiments of the present invention.

A control system 100 shown in FIG. 1 is a system for performing control of a predetermined operation (process) such as locking or unlocking (passive entry) of a door of an automobile, or startup (passive start) of the engine of the automobile based on a signal transmitted from a portable device having a wireless communication function.

The control system 100 can be used in the control of any operations and processes, but a system for performing the control of locking or unlocking (passive entry) of the door of the automobile, and startup (passive start) of the engine of the automobile will be described below by way of example. Unless particularly described, the following description can be applied to when the control system 100 performs the control of operations (processes) other than the passive entry and the passive start.

As shown in FIG. 1, the control system 100 is configured by an in-vehicle system 101 mounted on the automobile, and portable devices 102-1 to 102-6 carried by the user of the automobile. In the following description, the portable devices 102-1 to 102-6 are collectively referred to as a portable device 102 unless they do not need to be described distinguished from each other. The number of portable device 102 is arbitrary. For example, the number of portable devices may be less than or equal to five, or greater than or equal to seven.

The user approaches the automobile while carrying the portable device 102, positions the portable device 102 within the communicable range of the in-vehicle system 101, and operates a door knob or an engine start button of the automobile to lock or unlock the door of the automobile, or to startup the engine of the automobile. When accepting an instructing operation, the in-vehicle system 101 transmits a request signal to check the existence of the portable device 102, and executes the process instructed by the user when the portable device 102 is positioned within the communicable range of the in-vehicle system 101.

If the control system 100 operates in such a manner, the user can easily execute the locking or unlocking of the door of the automobile, or the startup of the engine of the automobile, or the like by simply operating the door knob or the engine start button of the automobile while carrying the portable device.

As shown in FIG. 1, the in-vehicle system 101 includes a passive entry/passive start ECU (Electronic Control Unit) 111. The passive entry/passive start ECU 111 is configured by a microcomputer including a CPU (Central Processing Unit), a ROM (Read Only Memory), a RAM (Random Access Memory) or the like (not shown). The passive entry/passive start ECU 111 performs processes related to the control of the locking and unlocking of the door of the automobile and the startup of the engine of the automobile.

The passive entry/passive start ECU 111 is connected with an input unit 121, a transmission antenna 122, a reception antenna 123, an output unit 124, and a vehicle control ECU 125.

The input unit 121 includes various types of input devices operated when the user instructs operations (processes) such as the locking or unlocking of the door of the automobile, or the startup of the engine of the automobile. For example, the input unit 121 includes an engine startup button 141, as well as lock/unlock switches 142 to 144.

The engine startup button 141 is an input device operated by the user to startup the engine of the automobile. The lock/unlock switch 142 is an input device operated by the user positioned on a driver seat side of the automobile to lock or unlock the door. The lock/unlock switch 143 is an input device operated by the user positioned on a passenger seat side of the automobile to lock or unlock the door. The lock/unlock switch 144 is an input device operated by the user positioned on a back side of the automobile to lock or unlock the door. When the user operates any of the input devices, the process execution request instruction is provided to the passive entry/passive start ECU 111.

The input unit 121 may obviously include input devices other than the above.

The transmission antenna 122 is a device for emitting the electric signal (request signal) provided by the passive entry/passive start ECU 111 to space as electric wave (electromagnetic wave). The transmission antenna 122 includes five antennas, LF (Low Frequency) antenna 151 to LF antenna 155. The transmission antenna 122 may include an arbitrary number of antennas.

The LF antenna 151 is an antenna for transmitting the request signal (wireless signal) to the portable device 102 positioned exterior to the vehicle on the driver seat side using a low frequency band (e.g., about 100 KHz). The LF antenna 152 is an antenna for transmitting the request signal (wireless signal) to the portable device 102 positioned exterior to the vehicle on the passenger seat side using a low frequency band. The LF antenna 153 is an antenna for transmitting the request signal (wireless signal) to the portable device 102 positioned near the seat (driver seat and passenger seat) at a front part of the vehicle interior using a low frequency band. The LF antenna 154 is an antenna for transmitting the request signal (wireless signal) to the portable device 102 positioned near the back seat of the vehicle interior using a low frequency band. The LF antenna 155 is an antenna for transmitting the request signal (wireless signal) to the portable device 102 positioned in a trunk room of the vehicle interior using a low frequency band.

The transmission antenna 122 may obviously include antennas other than the LF antenna.

The reception antenna 123 is a device for receiving the electric wave (electromagnetic wave) in space to convert the same into an electric signal (response signal). Specifically, the reception antenna 123 receives the response signal (wireless signal) transmitted by the portable device 102, converts the response signal to an electric signal, and provides the same to the passive entry/passive start ECU 111.

The output unit 124 includes an output device such as a speaker, LED (Light Emitting Diode), monitor, or output terminal. The output unit 124 outputs (or displays) the outputting information provided by the passive entry/passive start ECU 111 using an appropriate output device.

The vehicle control ECU 125 is configured by a microcomputer including a CPU, a ROM, a RAM, and the like (not shown), and controls the startup and the stop of the engine of the automobile based on the control of the passive entry/passive start ECU. The vehicle control ECU 125 controls an electronic steering lock 126 in accordance with the startup and the stop of the engine, so that the steering wheel is fixed to be immovable or the fixation of the steering wheel is released to be movable. The vehicle control ECU 125 controls a lock/unlock actuator 127 to lock and open a key of the door of the automobile.

The electronic steering lock 126 has a configuration of being controlled by the vehicle control ECU 125 to fix or release the fixation of the steering wheel of the automobile in an aim of preventing theft. For example, the electronic steering lock 126 fixes the steering wheel when the vehicle control ECU 125 stops the engine. The electronic steering lock 126 releases the fixation of the steering wheel when the vehicle control ECU 125 starts up the engine.

The lock/unlock actuator 127 has a configuration of being controlled by the vehicle control ECU 125 to lock and unlock the door of the automobile.

The passive entry/passive start ECU 111 is connected with a drive 128, as necessary, and appropriately attached with a removable medium 131 such as a magnetic disk, an optical disk, a magnetic optical disk, or a semiconductor memory, and the computer program read out therefrom is installed in the passive entry/passive start ECU 111, as necessary.

When the passive entry/passive start ECU 111 of the in-vehicle system 101 having the above configuration transmits the request signal via the transmission antenna 122, wireless signal 161-1 to wireless signal 161-5 containing the information of the request signal are emitted to space from each of the antennas of the LF antenna 151 to the LF antenna 155. The wireless signal 161-1 to the wireless signal 161-5 are collectively referred to as a wireless signal 161 unless they do not need to be described distinguished from each other.

The portable device 102 is a communication device for performing a wireless communication with the in-vehicle system 101 (passive entry/passive start ECU 111). When receiving the wireless signal 161, the portable device 102-1 to the portable device 102-6 emits a response signal (wireless signal 162-1 to wireless signal 162-6) containing the respective identification information to space. The wireless signal 162-1 to the wireless signal 162-6 are collectively referred to as a wireless signal 162 unless they do not need to be described distinguished from each other.

When the wireless signal 162 is received via the reception antenna 123 and the authentication of the identification information is successful, a process corresponding to the instruction inputted by the user through the input unit 121 is executed.

The portable device 102-1 to the portable device 102-6 are respectively assigned in advance with a timing (time) different from each other as a transmission timing (transmission scheduled time) of transmitting the response signal with respect to the request signal. The portable device 102-1 to the portable device 102-6 respectively emit the response signal (wireless signal 162-1 to wireless signal 162-6) to space at a timing (time) different from each other. Therefore, the occurrence of collision between the response signals is suppressed, and the passive entry/passive start ECU 111 of the in-vehicle system 101 can easily acquire the response signal.

The transmission timing (transmission scheduled time) may be any information as long as it is information representing timing, for example, information specifying the time itself, information specifying a time having a predetermined time as a reference, or information capable of specifying timing similar to time such as number of clocks and event specification. It may also be a series of programs for determining the transmission timing.

Figure 2:
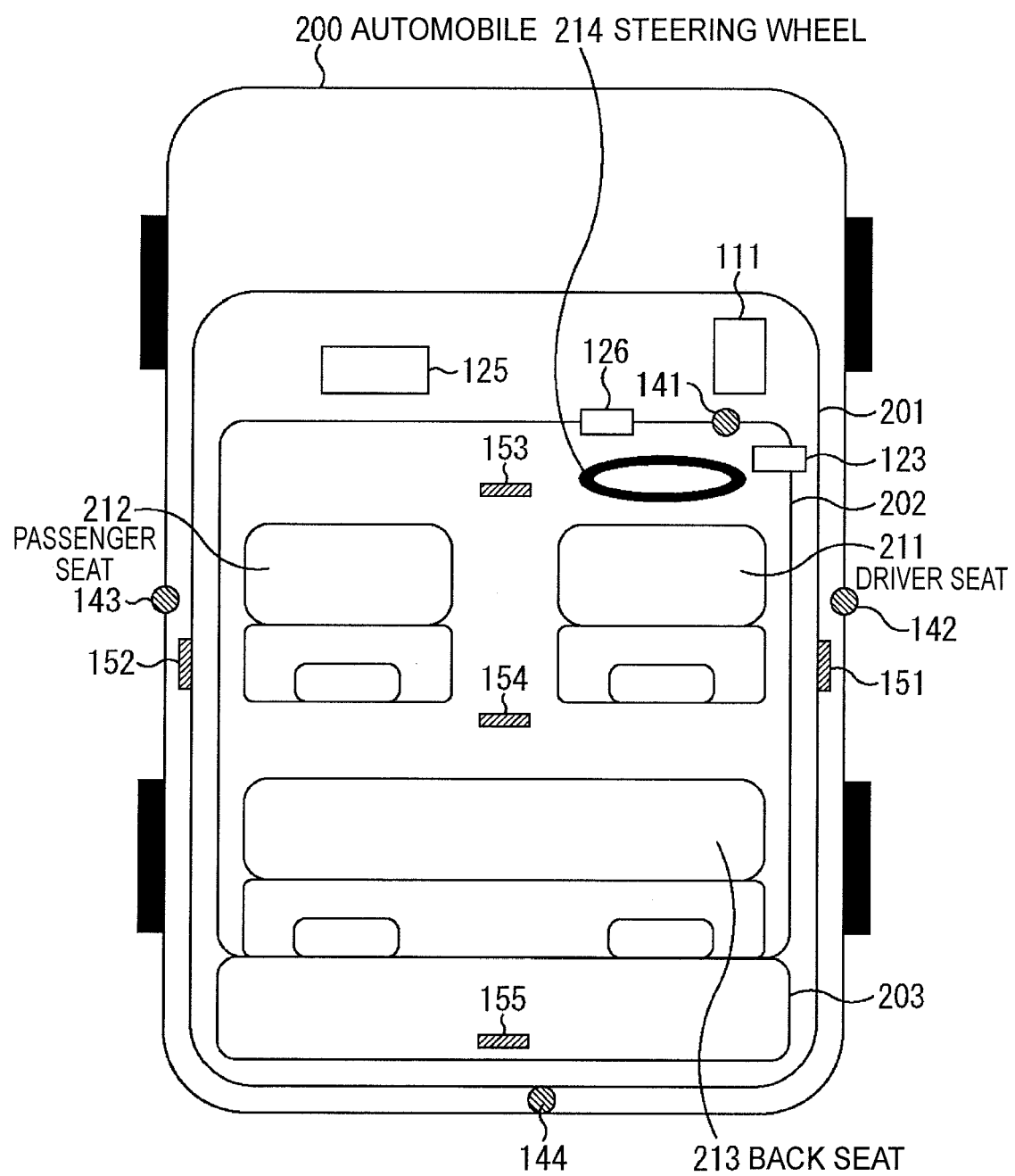
FIG. 2 is a view describing an arrangement example of each of devices of FIG. 1.

The arrangement position of each of the device of the in-vehicle system 101 of FIG. 1 will now be described. FIG. 2 is a view describing an arrangement example of the device of FIG. 1. In FIG. 2, an automobile 200 is an automobile mounted with the in-vehicle system 101. A frame 201 indicates the boundary between the vehicle interior and the vehicle exterior, a frame 202 indicates a vehicle interior space, and a frame 203 indicates a trunk room (carriage compartment). The upper side of FIG. 2 shows the front side of the automobile 200. As shown in FIG. 2, a driver seat 211 is arranged on the right side at the front part of the vehicle interior space, and a passenger seat 212 is arranged on the left side. Furthermore, a back seat 213 is arranged at the back in the vehicle interior space. A steering wheel 214 is arranged at the front part of the driver seat 211. Configurations other than the above are also obviously arranged in the automobile 200, but their description will not be given here.

As shown in FIG. 2, the passive entry/passive start ECU 111 and the vehicle control ECU 125 are arranged in an installment panel at the front side of the vehicle interior. The reception antenna 123 and the electronic steering lock 126 are arranged near the steering wheel 214, and the like. The engine startup button 141 is also arranged near the steering wheel 214 so as to be easily operated by the driver sitting at the driver seat 211.

The lock/unlock switch 142 is arranged at the door on the driver seat 211 side. The lock/unlock switch 143 is arranged at the door on the passenger seat 212 side. The lock/unlock switch 144 is arranged at the door at the back part of the automobile 200.

The LF antenna 151 or the transmission antenna 122 for the vehicle exterior driver seat side is arranged at the door on the driver seat 211 side. The LF antenna 152 or the transmission antenna 122 for the vehicle exterior passenger seat side is arranged at the door on the passenger seat 212 side. The LF antenna 153 or the transmission antenna 122 for the vehicle interior front seat is arranged on the front side between the driver seat 211 and the passenger seat 212 in the vehicle interior space. The LF antenna 154 or the transmission antenna 122 for the vehicle interior back seat is arranged on the back side between the driver seat 211 and the passenger seat 212 in the vehicle interior space. The LF antenna 155 or the transmission antenna 122 for the vehicle interior trunk room is arranged in the carriage compartment space.

The portable device 102 is basically carried around by the user.

Figure 3:
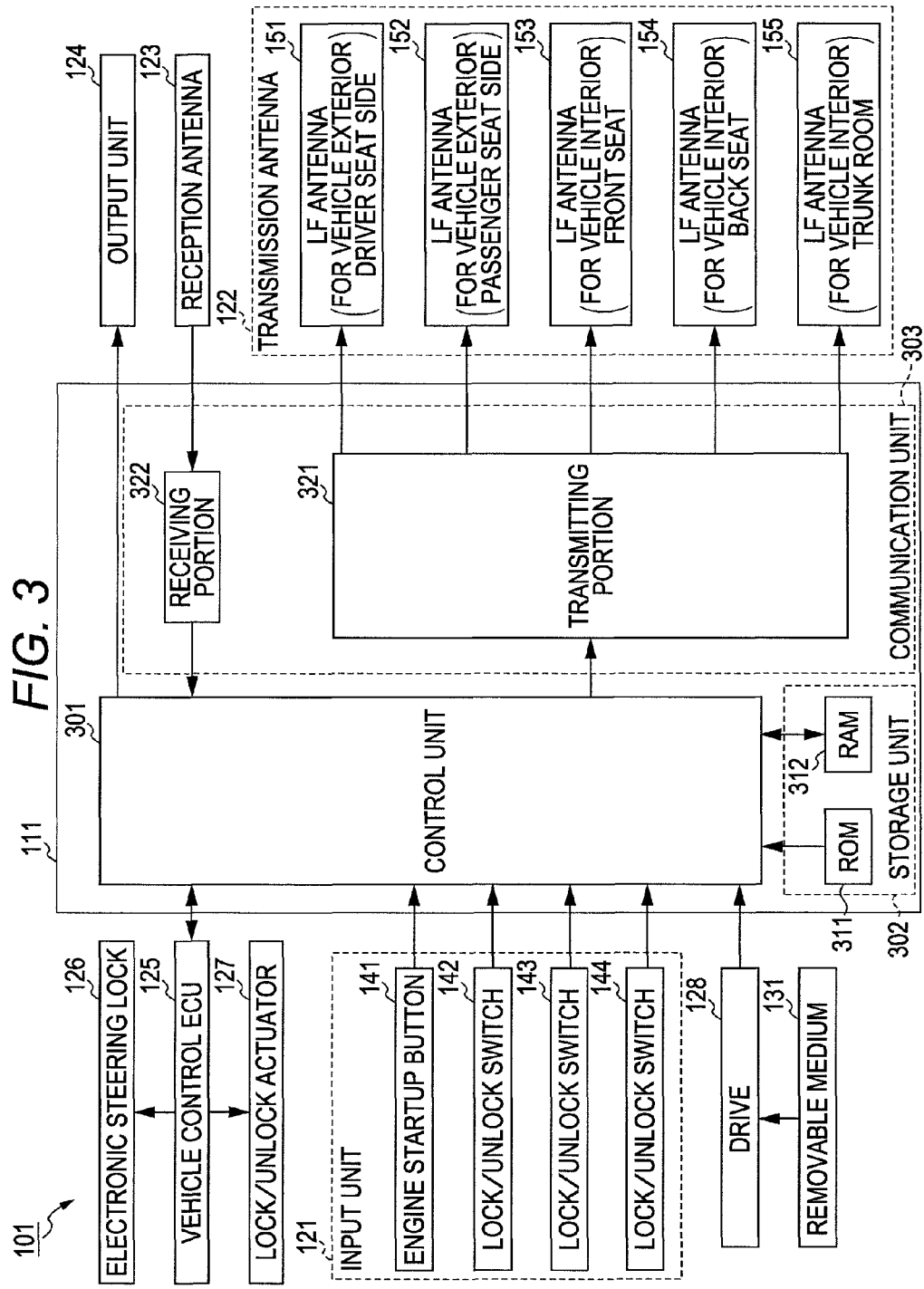
FIG. 3 is a block diagram showing a main configuration example of a passive entry/passive start ECU of FIG. 1.

The configuration of the passive entry/passive start ECU of FIG. 1 will now be described. FIG. 3 is a block diagram showing a main configuration example of the passive entry/passive start ECU 111 of FIG. 1.

As shown in FIG. 3, the passive entry/passive start ECU 111 includes a control unit 301, a storage unit 302, and a communication unit 303. The control unit 301 is configured by a CPU and the like, and performs various types of control processes. The control unit 301 is connected with devices such as the input unit 121 (engine startup button 141 as well as lock/unlock switch 142 to lock/unlock switch 144), the output unit 124, the vehicle control ECU 125, and the drive 128 exterior to the passive entry/passive start ECU 111 in addition to the storage unit 302 and the communication unit 303. The control unit 301 acquires information from such devices, and also controls such devices.

The storage unit 302 includes a ROM 311 with a non-rewritable storage region, and a RAM 312 with a rewritable storage region. The ROM 311 is stored with software program and data written at the time of factory shipment. The RAM 312 temporarily holds the software program being executed and the data being processed.

The control unit 301 loads the software program and data stored in the ROM 311 to the RAM 312, and executes various types of processing according to the loaded software program and data.

The storage unit 302 may include a rewritable non-volatile storage region such as a flash memory and a hard disk. In this case, the control unit 301 stores the software program and the data read out from the removal medium 131 through the drive 128, as well as, the data updated by the execution of the process to the flash memory and the hard disk. The information written to the flash memory and the hard disk are appropriately read out by the control unit 301, and loaded in the RAM 312.

The communication unit 303 includes a transmitting portion 321 for performing a process related to the transmission of the request signal and the like, and a receiving portion 322 for performing a process related to the reception of the response signal and the like transmitted by the portable device 102.

The transmitting portion 321 modulates the request signal and the like provided by the control unit 301, and transmits the same as a wireless signal through the transmission antenna 122 (LF antenna 151 to LF antenna 155). The receiving portion 322 demodulates the wireless signal acquired through the reception antenna 123, and provides the response signal of the electric signal to the control unit 301.

Figure 4:
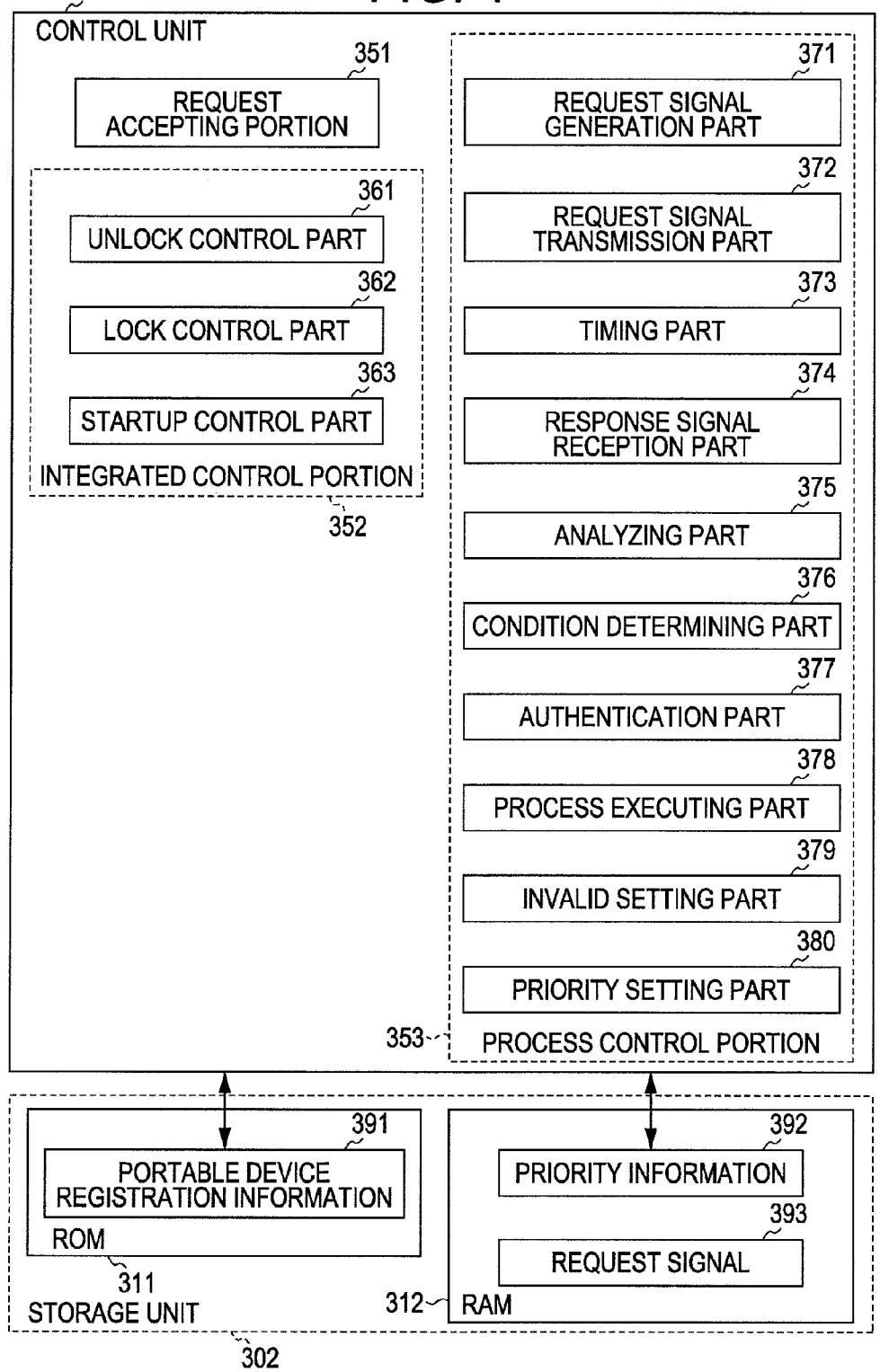
FIG. 4 is a function block diagram showing a main configuration example of functions implemented by a control unit of FIG. 3.

The functions implemented when the control unit 301 executes the process will now be described. FIG. 4 is a function block diagram showing a main configuration example of the functions implemented by the control unit of FIG. 3.

As shown in FIG. 4, the control unit 301 includes a request accepting portion 351, an integrated control portion 352, and a process control portion 353 as function blocks. Such function blocks are implemented when the control unit 301 executes the software program loaded in the RAM 312, for example.

The request accepting portion 351 accepts the request of the user based on the user instruction inputted through the input unit 121. The request accepting portion 351 causes the integrated control portion 352 to execute the process that satisfies the accepted request.

The integrated control portion 352 controls the process control portion 353 so as to perform the process corresponding to the request accepted at the request accepting portion 351. The process control portion 353 is controlled by the integrated control portion 352 to perform the process of a smaller unit. The integrated control portion 352 controls the process control portion 353 to execute the process necessary for implementing the requested function.

The integrated control portion 352 includes an unlock control part 361, a lock control part 362, and a startup control part 363. When the request to unlock the door is accepted at the request accepting portion 351, the unlock control part 361 controls the process control portion 353 to execute the process necessary for unlocking the door. When the request to lock the door is accepted at the request accepting portion 351, the lock control part 362 controls the process control portion 353 to execute the process necessary for locking the door. When the request to startup the engine is accepted at the request accepting portion 351, the startup control part 363 controls the process control portion 353 to execute the process necessary for starting up the engine.

The process control portion 353 includes a request signal generation part 371, a request signal transmission part 372, a timing part 373, a response signal reception part 374, an analyzing part 375, a condition determining part 376, an authentication part 377, a process executing part 378, an invalid setting part 379, and a priority setting part 380.

The request signal generation part 371 is controlled by the integrated control portion 352, and generates a request signal requesting for the transmission of the response signal to the portable device 102 according to a predetermined format. The details will be hereinafter described, but the request signal generation part 371 generates a request signal 393 by appropriately using the identification information of the automobile (or in-vehicle system 101 or passive entry/passive start ECU 111), the identification information of the LF antenna to use in the transmission of the request signal, the identification information of the request content and the like, and priority information 392 stored in the RAM 312, and holds the same in the RAM 312. The number and content of the generated request signal 393 are determined depending on which of the unlock control part 361 to the startup control part 363 performs the control (function implemented by the integrated control portion 352).

The request signal transmission part 372 controls the transmitting portion 321 of the communication unit 303, and transmits the request signal 393 held in the RAM 312 from a predetermined LF antenna of the transmission antenna 122 at a predetermined timing according to the timing process of the timing part 373. From which LF antenna to transmit the request signal 393 is determined depending on which of the unlock control part 361 to the startup control part 363 performs the control (function implemented by the integrated control portion 352).

The timing part 373 performs the timing process of measuring the time and specifying the current time, and controls the sequence (procedure) of the transmission of the request signal 393 and the reception of the response signal. For example, the timing part 373 performs the timing process, and notifies the request signal transmission part 372 of the transmission timing of the request signal 393. The transmission timing of the request signal 393 is determined depending on which of the unlock control part 361 to the startup control part 363 performs the control (function implemented by the integrated control portion 352). For example, the timing part 373 performs the timing process, and notifies the response signal reception part 374 of a period of receiving the response signal. The reception period of the response signal is determined depending on which of the unlock control part 361 to the startup control part 363 performs the control (function implemented by the integrated control portion 352), the number of portable devices 102, and the like.

The response signal reception part 374 controls the receiving portion 322 of the communication unit 303, and performs the reception of the response signal through the reception antenna 123. The response signal reception part 374 receives the response signal for a predetermined period according to the timing process of the timing part 373.

The analyzing part 375 analyzes the response signal acquired by the response signal reception part 374. The condition determining part 376 performs the determination of the process executing condition with respect to the response signal. For example, the condition determining part 376 determines whether or not the setting is such that the acquired response signal is made invalid. The invalid setting is appropriately performed by the invalid setting part 379. The determination result by the condition determining part 376 is provided to the authentication part 377 and the process executing part 378.

The authentication part 377 authenticates the identification information of the portable device 102 contained in the response signal acquired by the response signal reception part 374 based on the analysis result by the analyzing part 375. The ROM 311 of the storage unit 302 is stored in advance with portable device registration information 391 including information related to the portable device 102 legitimate with respect to the in-vehicle system 101. The authentication part 377 authenticates the identification information of the portable device 102 contained in the response signal using the identification information of the portable device 102 contained in the portable device registration information 391. The authentication result by the authentication part 377 is provided to the process executing part 378. If determined that the setting is such that the response signal is made invalid by the condition determining part 376, the authentication part 377 does not perform the authentication process.

The process executing part 378 controls the vehicle control ECU 125, and executes the process corresponding to the request accepted at the request accepting portion 351 such as locking or unlocking of the door, the startup of the engine, and the like. For example, when controlled by the unlock control part 361, the process executing part 378 controls the lock/unlock actuator 127 through the vehicle control ECU 125, to unlock the door. When controlled by the lock control part 362, the process executing part 378 controls the lock/unlock actuator 127 through the vehicle control ECU 125, to lock the door. When controlled by the startup control part 363, the process executing part 378 controls the vehicle control ECU 125 to start up the engine, or controls the electronic steering lock 126 through the vehicle control ECU 125 to have the steering wheel 214 movable. If determined that the setting is such that the response signal is made invalid by the condition determining part 376 or if the authentication by the authentication part 377 fails, the process executing part 378 does not execute the process corresponding to the request accepted at the request accepting portion 351.

The invalid setting part 379 performs an invalidation setting of making the acquired response signal invalid when the process is executed by the process executing part 378 so that the process is not executed on the subsequent response signals. The invalid setting is provided to the condition determining part 376, the authentication part 377, and the process executing part 378.

The priority setting part 380 generates the priority information 392 determining the priority of the response signal transmission timing of each of the portable devices 102 based on the reception result of the response signal and the portable device registration information 391, and holds the same in the RAM 312. If the priority information 392 is already held in the RAM 312, the priority setting part 380 may overwrite and update the old priority information 392 with the newly generated new priority information 392. Obviously, both the old priority information 392 and the new priority information 392 may be held in the RAM 312. The priority information 392 is appropriately used for the generation of the request signal 393 by the request signal generation part 371, as described above.

The portable device registration information 391 is information including information related to the portable device 102 legitimate with respect to the in-vehicle system 101, and is stored in advance in the ROM 311 of the storage unit 302. A rewritable storage medium such as a flash memory or a hard disk may be arranged in the storage unit 302, and the portable device registration information 391 may be stored therein. In this case, the portable device registration information 391 may be updatable.

The portable device registration information 391 includes the identification information of the portable device 102, the information indicating the response timing (transmission timing of response signal) of the portable device 102, and the like. The response timing is indicated by the time from when the portable device 102 receives the request signal until the portable device transmits the response signal with respect to the request signal. The response timing of the portable device 102 is set to a different value for every portable device 102. In other words, when the portable device 102 transmits the response signal with respect to the same request signal received at the same timing, the response signal is set to be transmitted at different timing (individual timing) from each other in the portable device registration information 391.

The response timing may be set in plurals with respect to the portable device 102 so that one portable device 102 transmits the response signal over a plurality of times with respect to one request signal. In this case, when transmitting the response signal with respect to the same request signal received at the same timing, the portable device 102 can set so that the response signal is transmitted not only at the individual timing but also at the timing (common timing) common to each other. That is, in the portable device registration information 391, the portable device 102 is set so that the response signal is transmitted at the individual timing at least once with respect to the same request signal received at the same timing.

The priority information 392 is information showing the priority of the response signal transmission of the portable device 102, as described above. The transmission timing of the response signal of the portable device 102 is defined in advance by the portable device registration information 391, as described above. That is, the initial state of the priority of the response signal transmission of the portable device 102 is registered in the portable device registration information 391. However, as shown in FIG. 1, even when six portable devices 102 (portable device 102-1 to portable device 102-6) are registered in the portable device registration information 391 as legitimate portable devices 102, all such portable devices 102 may not necessarily always exist within the communicable range of the in-vehicle system 101. A case where only the portable device 102-6 exists within the communicable range of the in-vehicle system 101 may be considered.

When each of the portable devices 102 transmits the response signal at the individual timing, and the individual timing of the portable device 102-6 is set the last in the legitimate portable devices 102 in the portable device registration information 391, the portable device 102-6 waits while other portable devices 102 transmit the response signal at the respective individual timing, and transmits the response signal after reaching the individual timing set to itself. As described above, if only the portable device 102-6 exists within the communicable range of the in-vehicle system 101, the period in which the non-existing portable device 102-1 to the portable device 102-5 transmit the response signal is unnecessary. That is, the portable device 102-6 transmits the response signal after waiting for the unnecessary period. In other words, the response time from when the instruction is inputted by the user until the process with respect to such an instruction is executed unnecessarily increases.

The priority setting part 380 generates the priority of the response signal transmission, that is, the priority information 392 of updating the individual timing based on the reception result of the response signal. In the next request, the transmission timing of the response signal is set using the priority information 392. For example, if only the portable device 102-2, the portable device 102-4, and the portable device 102-6 of the six portable devices 102 exist within the communicable range of the in-vehicle system 101, the priority setting part 380 sets the priority of the response signal transmission in the order of the portable device 102-2, the portable device 102-4, the portable device 102-6, the portable device 102-1, the portable device 102-3, and the portable device 102-5. In this way, the portable device 102 existing within the communicable range of the in-vehicle system 101 can suppress the production of an unnecessary waiting time in the transmission of the response signal with respect to the next request.

The request signal 393 is generated according to a predetermined format by the request signal generation part 371. The request signal 393 includes the identification information of the automobile (or in-vehicle system 101 or passive entry/passive start ECU 111), the identification information of the LF antenna to use in the transmission of the request signal, the identification information of the request content and the like, the priority of the response signal transmission of the portable device 102, and the like. The number and content of the request signal 393 are determined depending on which of the unlock control part 361 to the startup control part 363 performs the control (function implemented by the integrated control portion 352).

Figure 5:
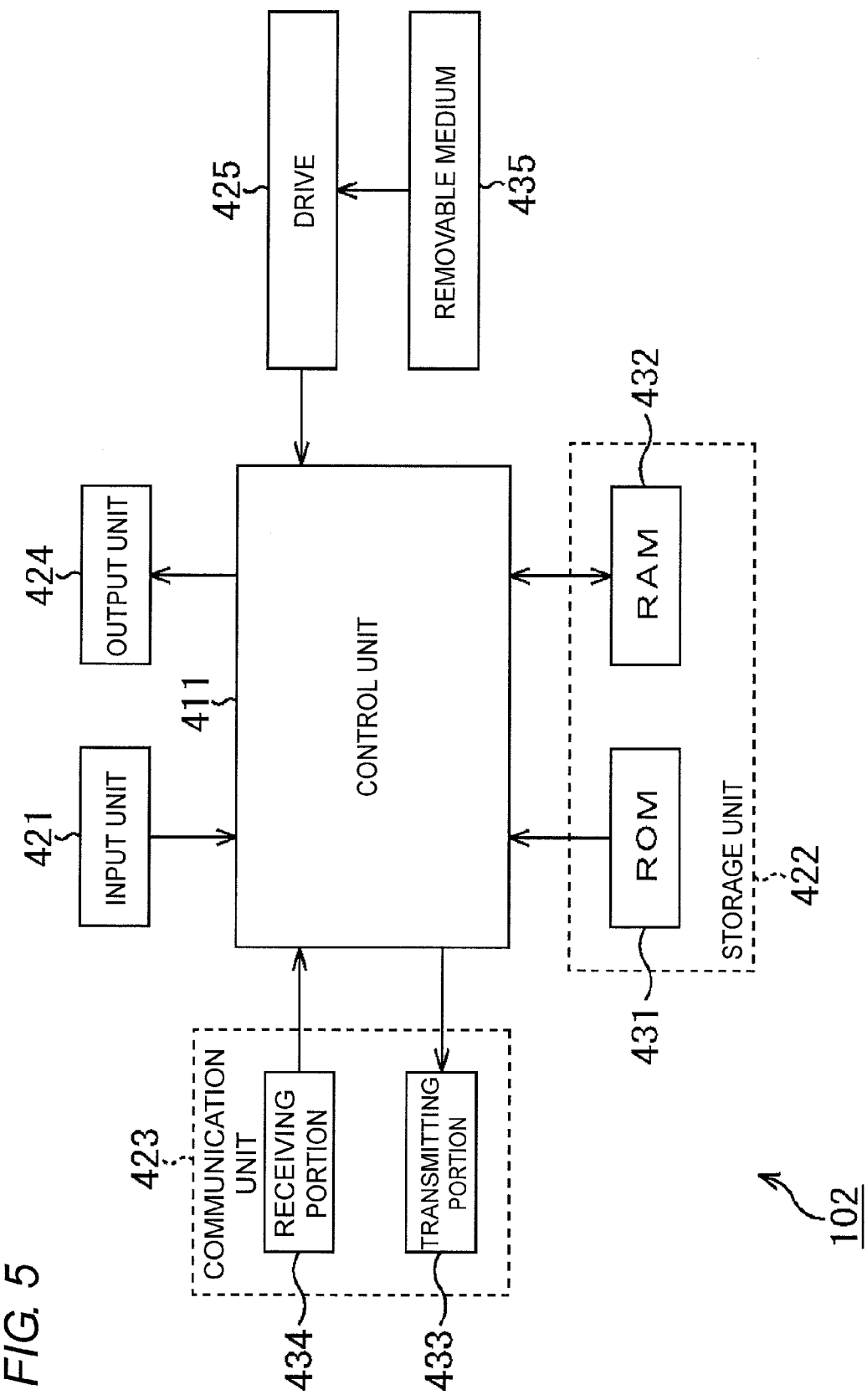
FIG. 5 is a block diagram showing a main configuration example of a portable device of FIG. 1.

The portable device 102 will now be described. FIG. 5 is a block diagram showing a main configuration example of the portable device 102 of FIG. 1.

As shown in FIG. 5, the portable device 102 includes a control unit 411, an input unit 421, a storage unit 422, a communication unit 423, and an output unit 424. The control unit 411 is configured by a CPU and the like, and performs various control processing.

The input unit 421 includes various types of input devices operated by the user such as a button and a switch.

The storage unit 422 includes a ROM 431 with a non-rewritable storage region, and a RAM 432 with a rewritable storage region. The ROM 431 is stored with software program and data written at the time of factory shipment. The RAM 432 temporarily holds the software program being executed and the data being processed.

The control unit 411 loads the software program and data stored in the ROM 431 to the RAM 432, and executes various types of processing according to the loaded software program and data.

The storage unit 422 may include a rewritable non-volatile storage region such as a flash memory and a hard disk. In this case, the control unit 411 stores the software program and the data read out from a removal medium 435 through the drive 425, as well as, the data updated by the execution of the process to the flash memory and the hard disk. The information written to the flash memory and the hard disk are appropriately read out by the control unit 411, and loaded in the RAM 432.

The communication unit 423 includes a receiving portion 434 for performing a process related to the reception of the response signal and the like transmitted by the in-vehicle system 101, and a transmitting portion 433 for performing a process related to the transmission of the request signal and the like. The transmitting portion 433 modulates the request signal and the like provided by the control unit 411, and transmits the same as a wireless signal through the antenna (not shown). The receiving portion 434 demodulates the wireless signal acquired through the antenna (not shown), and provides the request signal of the obtained electric signal to the control unit 411.

The output unit 424 includes an output device such as a speaker, an LED, a monitor, or an output terminal. The output unit 424 outputs (or displays) the outputting information provided by the control unit 411 using an appropriate output device.

The control unit 411 is connected with a drive 425, as necessary, and appropriately attached with a removable medium 435 such as a magnetic disk, an optical disk, a magnetic optical disk, or a semiconductor memory, and the computer program read out therefrom is installed in the control unit 411, as necessary.

Figure 6:
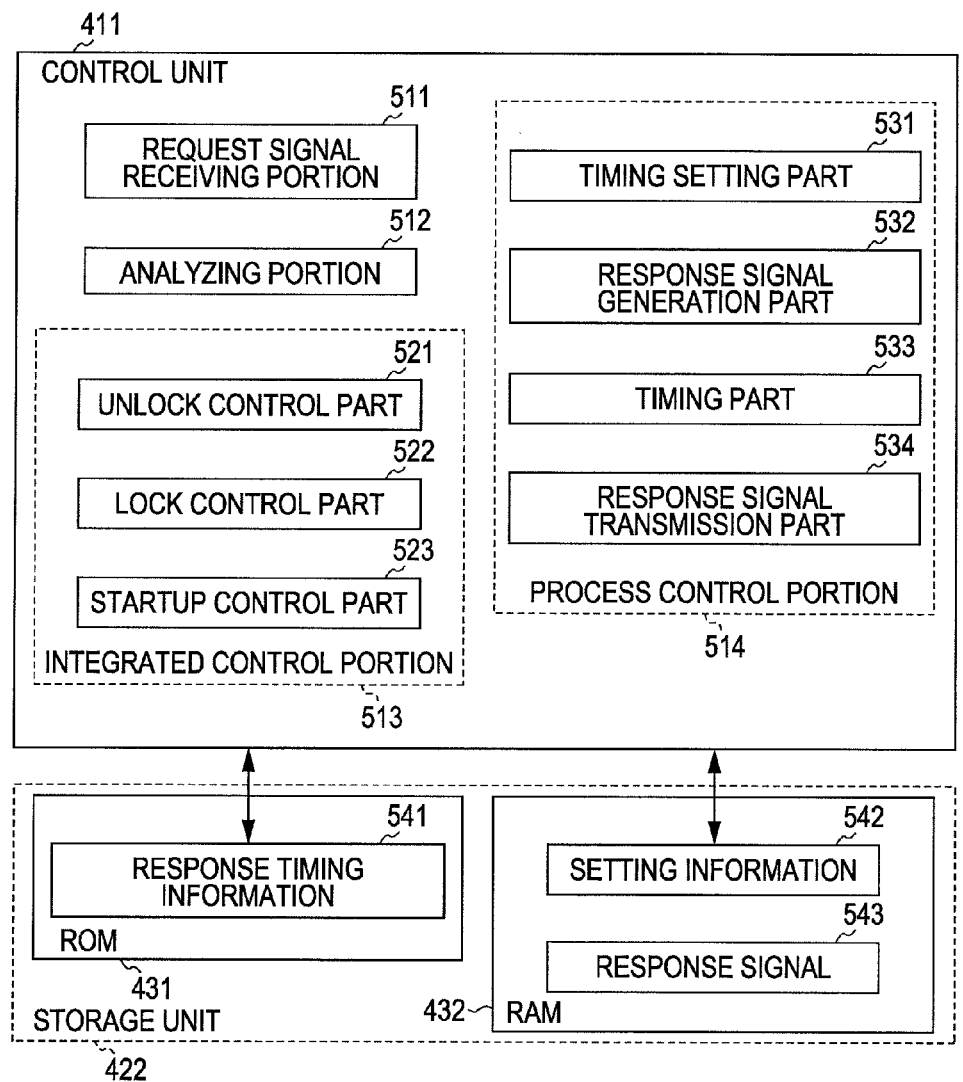
FIG. 6 is a function block diagram showing a main configuration example of functions implemented by a control unit of FIG. 5.

The functions implemented when the control unit 411 executes the process will now be described. FIG. 6 is a function block diagram showing a main configuration example of the functions implemented by the control unit of FIG. 5.

As shown in FIG. 6, the control unit 411 includes a request signal receiving portion 511, an analyzing portion 512, an integrated control portion 513, and a process control portion 514 as function blocks. Such function blocks are implemented when the control unit 411 executes the software program loaded in the RAM 432.

The request signal receiving portion 511 controls the receiving portion 434 of the communication unit 423, and receives the request signal requesting for the transmission of the response signal transmitted by the in-vehicle system 101. The analyzing portion 512 analyzes the request signal acquired by the request signal receiving portion 511.

The integrated control portion 513 controls the process control portion 514 so as to perform the process related to the generation and the transmission of the response signal corresponding to the process executed by the in-vehicle system 101 based on the analysis result by the analyzing portion 512. The process control portion 514 is controlled by the integrated control portion 513 to perform the process of a smaller unit.

The request signal acquired by the request signal receiving portion 511 contains identification information indicating the process to be executed by the in-vehicle system 101. The integrated control portion 513 controls the process control portion 514 to execute the process necessary for the generation and the transmission of the response signal corresponding to the process indicated by the identification information obtained by the analysis of the analyzing portion 512.

The integrated control portion 513 includes an unlock control part 521, a lock control part 522, and a startup control part 523. When the identification information contained in the request signal indicates unlocking of the door, the unlock control part 521 controls the process control portion 514 to execute the process necessary for transmitting an appropriate response signal. When the identification information contained in the request signal indicates locking of the door, the lock control part 522 controls the process control portion 514 to execute the process necessary for transmitting an appropriate response signal. When the identification information contained in the request signal indicates startup of the engine, the startup control part 523 controls the process control portion 514 to execute the process necessary for transmitting an appropriate response signal.

The process control portion 514 includes a timing setting part 531, a response signal generation part 532, a timing part 533, and a response signal transmission part 534.

The timing setting part 531 is controlled by the integrated control portion 352, and performs the setting of the transmission timing (response timing) of the response signal. The timing setting part 531 sets the response timing corresponding to the process executed by the in-vehicle system 101 such as the unlocking or locking of the door, the startup of the engine, and the like, based on the response timing information 541 and the like stored in advance in the ROM 431, and holds the setting information 542 containing such information in the RAM 432. That is, the unlock control part 521 to the startup control part 523 causes the timing setting part 531 to set the response timing corresponding to the process corresponding to itself.

The response signal generation part 532 is controlled by the integrated control portion 352, generates a response signal 543 corresponding to the process executed by the in-vehicle system 101 such as the unlocking or locking of the door, the startup of the engine, and the like, based on the result of analysis by the analyzing portion 512, and holds the same in the RAM 432. The timing part 533 performs the timing process of measuring the time and specifying the current time according to the setting indicated by the setting information 542 held in the RAM 432, and notifies the response signal transmission part 534 of the response timing etc. to control the sequence of the transmission of the response signal 543. The response signal transmission part 534 controls the transmitting portion 433 of the communication unit 423 to transmit the response signal 543 held in the RAM 432 at a predetermined timing (e.g., after elapse of predetermined time from when request signal is received) according to the timing process of the timing part 533.

The response timing information 541 is information indicating the transmission timing (response timing) of the response signal 543 of the portable device 102 itself, and is stored in advance in the ROM 431 of the storage unit 422. The response timing corresponds to the response timing indicated in the portable device registration information 391. That is, the response timing information 541 contains information indicating the response timing of the portable device 102 itself of the response timing indicated by the portable device registration information 391. As described above, the content of the response timing information 541 differs for every portable device 102 since the response timing includes at least the individual timing.

As described above, the response timing is independently set for every process executed by the in-vehicle system 101 such as the unlocking or locking of the door, the startup of the engine, or the like. That is, the response timing may differ for every process executed by the in-vehicle system 101. The unlock control part 521 to the startup control part 523 control the timing setting part 531, and for example, select the timing corresponding to the process corresponding to itself of the response timings contained in the response timing information 541, and set the same as the response timing (generate setting information 542).

The storage unit 422 may include a rewritable storage medium such as a flash memory or a hard disk, and the response timing information 541 may be stored therein. In this case, the response timing information 541 may be updatable.

The setting information 542 is information indicating the set value related to the transmission of the response signal 543 such as the setting of the response timing. The response signal 543 is generated according to a predetermined format by the response signal generation part 532.

The flow of exchange of information between the passive entry/passive start ECU 111 of the in-vehicle system 101 and the portable device 102 will now be described. FIG. 7 is a flowchart describing an example of the flow of process of the entire control system.

When the user operates the input unit 121, the passive entry/passive start ECU 111 transmits a request signal, and the portable device 102 positioned within the communicable range receives the request signal and transmits a response signal with respect to the request signal. When receiving the response signal, the passive entry/passive start ECU 111 performs the authentication process of the portable device 102 that transmitted the response signal, and executes the process corresponding to the user instruction inputted through the input unit 121 if the authentication is successful.

More specifically describing, when the user carrying the portable device 102 operates the input unit 121 to request for the execution of unlocking or locking of the door, the startup of the engine, or the like, the passive entry/passive start ECU 111 accepts a process request inputted through the input unit 121 in step S101, generates the request signal in step S102, and transmits the request signal in step S103.

The portable device 102 receives the request signal in step S121, generates the response signal with respect to the request signal in step S122, and transmits the response signal in step S123.

The passive entry/passive start ECU 111 receives the response signal in step S104, performs the authentication process of the portable device 102, which is the transmission source of the response signal, in step S105, and executes the process requested by the process request in step S106 if the authentication is successful.

In the above flow of processes, the portable device 102 transmits the response signal at an individual timing different from other portable devices 102 with the reception time of the request signal as a reference. Therefore, the occurrence of collision among the response signals is suppressed, and the control system 100 can more accurately carry out the communication. With this, the passive entry/passive start ECU 111 does not need to transmit individual request signal to each of the portable devices 102, and merely needs to transmit a common request signal to all portable devices 102 at least once. In other words, the control system 100 can more efficiently carry out the communication more efficiently.

The content of the request signal and the response signal exchanged between the passive entry/passive start ECU 111 and the portable device 102 will now be described. FIGS. 8A to 8D are schematic diagrams each showing a configuration example of the information transmitted and received in the control system.

Figure 8A:
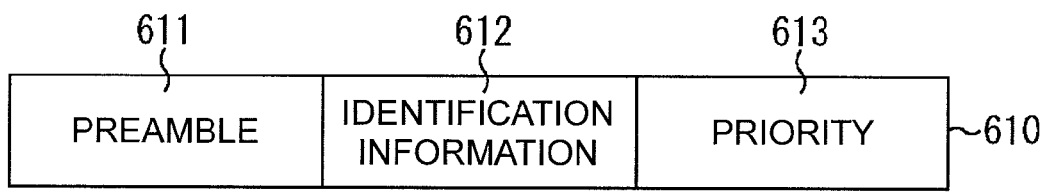
FIGS. 8A to 8D are schematic diagrams each showing a configuration example of information transmitted and received in the control system.

A request signal 610 shown in FIG. 8A shows a configuration example of a request signal transmitted to the portable device 102 positioned at the vehicle exterior of the automobile 200 through the LF antenna 151 or the transmission antenna 122 for the vehicle exterior driver seat side or the LF antenna 152 or the transmission antenna 122 for the vehicle exterior passenger seat side.

The request signal 610 includes information such as preamble 611, identification information 612, and priority 613. The preamble 611 is standard information indicating that the request signal 610 is a request signal. The identification information 612 includes identification information of the automobile 200, identification information of the process executed in the in-vehicle system 101 such as locking or unlocking of the door of the automobile, the startup of the engine of the automobile, or the like, identification information indicating the LF antenna (LF antenna 151 or LF antenna 152) used in the transmission of the request signal 610, identification information of the request signal 610 itself, and the like. The priority 613 includes the priority (content of priority information 392) set by the priority setting part 380. The request signal 610 may obviously include other information.

For example, the analyzing portion 512 of the portable device 102 can analyze the preamble 611 of the request signal 610 to recognize that the request signal 610 is a request signal. The analyzing portion 512 of the portable device 102 can analyze the identification information 612 of the request signal 610 to grasp the automobile 200 which is the transmission source of the request signal 610, the process corresponding to the request signal 610, the fact that the request signal 610 is a signal transmitted to the vehicle exterior, and the like. Furthermore, the analyzing portion 512 of the portable device 102 can analyze the priority 613 of the request signal 610 to grasp the update state of the response timing.

Figure 8B:
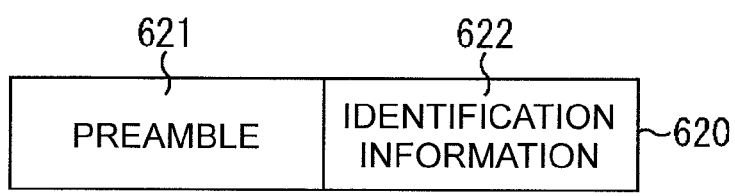

A request signal 620 shown in FIG. 8B shows a configuration example of a request signal transmitted to the portable device 102 positioned in the vehicle interior when checking the portable device 102 positioned at the vehicle exterior of the automobile 200 through the LF antenna 153 or the transmission antenna 122 for the vehicle interior front seat, the LF antenna 154 or the transmission antenna 122 for the vehicle interior back seat, or the LF antenna 155 or the transmission antenna 122 for the vehicle interior trunk room.

The request signal 620 includes information such as preamble 621 and identification information 622. The preamble 621 is standard information indicating that the request signal 610 is a request signal. The identification information 622 includes identification information of the process executed in the in-vehicle system 101, identification information indicating the LF antenna (one of LF antenna 153 to LF antenna 155) used in the transmission of the request signal 610, and the like. The request signal 620 may obviously include other information.

The request signal 620 is a request signal corresponding to the process which execution is prohibited when the portable device 102 exists in the vehicle interior such as the locking process. That is, the request signal 620 is provided only to check whether or not the portable device 102 exists within a prohibited area. Since the request signal is a signal transmitted to the vehicle interior, the request signal 620 has some information omitted compared to the request signal 610.

Figure 8C:
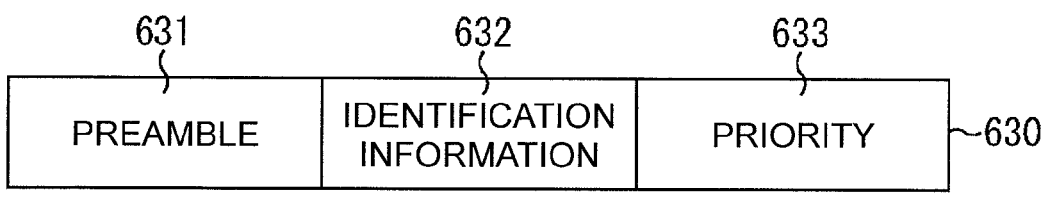

A request signal 630 shown in FIG. 8C shows a configuration example of a request signal transmitted to the portable device 102 positioned at the vehicle interior of the automobile 200 through the LF antenna 153 or the transmission antenna 122 for the vehicle interior front seat, the LF antenna 154 or the transmission antenna 122 for the vehicle interior back seat, or the LF antenna 155 or the transmission antenna 122 for the vehicle interior trunk room.

The request signal 630 includes information such as preamble 631, identification information 632, and priority 633. Similar to the preamble 611, the preamble 631 is standard information indicating that the request signal 610 is a request signal. Similar to the identification information 612, the identification information 632 includes identification information of the process executed in the in-vehicle system 101 such as locking or unlocking of the door of the automobile, the startup of the engine of the automobile, or the like, identification information indicating the LF antenna (LF antenna 151 or LF antenna 152) used in the transmission of the request signal 630, identification information of the request signal 630 itself, and the like. Similar to the priority 613, the priority 633 includes the priority (content of priority information 392) set by the priority setting part 380. The request signal 630 may obviously include other information.

The request signal 630 is a signal transmitted towards the vehicle interior, and thus the identification information of the automobile 200 can be omitted. Similar to the case of the request signal 610, the analyzing portion 512 of the portable device 102 analyzes each part of the request signal 630 to grasp various types of information.

Figure 8D:
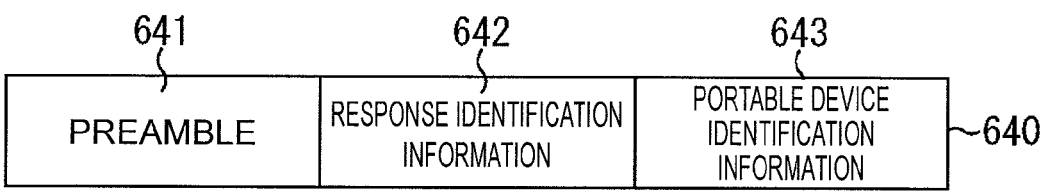

A response signal 640 shown in FIG. 8D shows a configuration example of a response signal transmitted by the portable device 102. The response signal 640 includes preamble 641, response identification information 642, and portable device identification information 643.

The preamble 641 is standard information indicating that the response signal 640 is a response signal. The response identification information 642 is information indicating to which request signal the response signal 640 corresponds. For example, the response identification information 642 includes identification information of the process executed in the in-vehicle system 101, identification information indicating the LF antenna used in the transmission of the request signal, identification information of the request signal itself, and the like. The portable device identification information 643 is information for identifying the portable device 102 which is the transmission source of the response signal 640. The response signal 640 may obviously include other information.

For example, the analyzing part 375 of the passive entry/passive start ECU 111 can analyze the preamble 641 of the response signal 640 to recognize that the response signal 640 is a response signal. The analyzing part 375 of the passive entry/passive start ECU 111 can analyze the response identification information 642 of the response signal 640 to grasp the request signal and the like corresponding to the response signal 640. Furthermore, the analyzing part 375 of the passive entry/passive start ECU 111 can analyze the portable device identification information 643 of the response signal 640 to grasp the portable device 102 of the transmission source of the response signal.

A sequence of exchanging such request signal and response signal will now be described. First, an example of the transmission and reception timing of the request signal and the response signal when the unlocking of the door is requested by the user will be described first with reference to FIG. 9.

In FIG. 9, the time series proceeds from the left side towards the right side in the figure, as shown with an arrow at the uppermost stage. Each stage lined up and down in the figure indicates the transmission and reception timing of each signal. The stage of "SW" shows the timing process start timing of the timing part 373. That is, the timing process starts when the signal "SW" becomes Low at time T1.

The stage "front part of vehicle interior" immediately below shows the transmission timing of the request signal transmitted to the front part of the vehicle interior of the automobile 200 (near driver seat 211 and passenger seat 212) through the LF antenna 153. The stage "back part of vehicle interior" immediately below shows the transmission timing of the request signal transmitted to the back part of the vehicle interior of the automobile 200 (near back seat 213) through the LF antenna 154.

The stage "vehicle exterior operation side" immediately below shows the transmission timing of the request signal transmitted to the vehicle exterior on the side the user performed the unlock instructing operation of the automobile 200 through the LF antenna 151 or the LF antenna 152. The stage "vehicle exterior opposite side" immediately below shows the transmission timing of the request signal transmitted to the vehicle exterior on the side opposite to the side the user performed the unlock instructing operation of the automobile 200 through the LF antenna 151 or the LF antenna 152.

The transmission timing of the request signal with respect to the vehicle interior trunk room will be omitted for the sake of convenience of the explanation. The request signal may be transmitted at the above timing, or the request signal may be transmitted in accordance with one of the above timings.

The stages "portable device 1" to "portable device 6" respectively show the transmission timing of the response signal transmitted by the portable device 102-1 to the portable device 102-6.

As shown in FIG. 9, the request signal is transmitted two times each at the timing different from each other with respect to the front part of the vehicle interior and the back part of the vehicle interior so that the request signals do not collide and so as to be more reliably transmitted to the portable device 102 (request signal 711 to request signal 714). For example, the request signal 711 is transmitted between time T2 and time T3. The request signal 712 is transmitted between time T4 and time T5. The request signal 713 is transmitted between time T6 and time T7. The request signal 714 is transmitted between time T8 and time T9.

The request signal is transmitted at the timing different from the timing described above so as not to collide with the request signal transmitted towards the vehicle interior with respect to the side the user inputs the instructing operation at the vehicle exterior (request signal 715). For example, the request signal 715 is transmitted between time T10 and T11.

A disturbing signal 716 may be transmitted at the same timing as the request signal 715 to suppress the occurrence of collision between the request signals with respect to the side opposite to the side the user inputs the instructing operation at the vehicle exterior. For example, the disturbing signal 716 is transmitted between time T10 and T11.

When receiving one of the request signals, the portable device 102-1 to the portable device 102-6 first transmits the response signal at a common timing to respond faster. For example, at time T12 to time T13, the portable device 102-1 transmits a response signal 721, the portable device 102-2 transmits a response signal 722, the portable device 102-3 transmits a response signal 723, the portable device 102-4 transmits a response signal 724, the portable device 102-5 transmits a response signal 725, and the portable device 102-6 transmits a response signal 726.

The portable device 102-1 to the portable device 102-6 transmits the response signal at the respective individual timing to suppress the occurrence of collision between the response signals. For example, the portable device 102-1 transmits a response signal 731 at the timing the transmission finishes at time T14. The portable device 102-2 transmits a response signal 732 at the timing the transmission finishes at time T15. The portable device 102-3 transmits a response signal 733 at the timing the transmission finishes at time T16. The portable device 102-4 transmits a response signal 734 at the timing the transmission finishes at time T17. The portable device 102-5 transmits a response signal 735 at the timing the transmission finishes at time T18. The portable device 102-6 transmits a response signal 736 at the timing the transmission finishes at time T19.

The in-vehicle system 101 (passive entry/passive start ECU 111) receives the response signals transmitted in the above manner until time T19.

The portable device 102-1 to the portable device 102-6 thus transmit the response signals (response signal 731 to response signal 736) at individual timing different from each other with respect to the common request signals (request signal 711 to request signal 715) for all terminals. The occurrence of collision among the response signals is then suppressed. Therefore, the portable device 102-1 to the portable device 102-6 can more reliably transmit the response signal to the in-vehicle system 101 (passive entry/passive start ECU 111).

Since the portable device 102 is registered in the in-vehicle system 101 in advance and the above-described sequence is defined in advance, the portable device 102 can transmit the response signal at the respective individual timing, as described above, with respect to the request signal common to all portable devices 102 (not transmitted with respect to a specific portable device 102) transmitted by the in-vehicle system 101 (passive entry/passive start ECU 111). In other words, the in-vehicle system 101 (passive entry/passive start ECU 111) can reduce the number of transmissions of the request signal. Thus, the control system 100 can not only reduce the period necessary for communication but can also suppress the power consumption necessary for communication. That is, the control system 100 can more efficiently carry out the communication.

The time (response time) from when the user requests to unlock the door until the door is actually unlocked is preferably as short as possible. If the response time is long, the time the user waits becomes longer (i.e., reaction is blunt). Therefore, the user may feel unpleasant if the response time is unnecessarily long. In the case of the unlocking process, in particular, the door unlocked by the user is often opened. If the waiting time becomes long, such subsequent operation cannot be performed and the unpleasantness becomes greater.

As shown in FIG. 9, the transmission timing of the response signal 736 is later than the transmission timing of the response signal 731. That is, if only the portable device 102-6 exists within the communicable range of the in-vehicle system 101, the time (response time) from when the user instructs unlocking until the door is actually opened becomes long compared to when the portable device 102-1 exists within the communicable range of the in-vehicle system 101.

The portable device 102-1 to the portable device 102-6 thus transmit the response signals all together at the common timing earlier than the individual timing so that all portable devices 102 can transmit the response signal at a sufficiently early timing. For example, if only the portable device 102-6 exists in the communication range of the in-vehicle system 101, as described above, the response signals transmitted at the common timing do not collide, and thus the in-vehicle system 101 (passive entry/passive start ECU 111) can receive the response signals at the common timing. That is, the response speed with respect to the process request of the user can be enhanced compared to when the response signal is transmitted only at the individual timing.

When the response signals transmitted at the common timing collide, a plurality of response signals exists. In other words, the portable device 102 (one of or all of the portable device 102-1 to the portable device 102-5) other than the portable device 102-6 exists within the communicable range of the in-vehicle system 101. Therefore, the in-vehicle system 101 (passive entry/passive start ECU 111) can receive the response signal transmitted at the individual timing from another portable device 102 before the response signal transmitted at the individual timing by the portable device 102-6.

That is, the response speed with respect to the process request of the user can be enhanced compared to when the response signal transmitted from the portable device 102-6 is received by the in-vehicle system 101 (passive entry/passive start ECU 111).

Obviously, even if a plurality of portable device 102 exists within the communicable range of the in-vehicle system 101, the response signals transmitted from each of the portable devices 102 at the common timing may not collide. In this case, the in-vehicle system 101 (passive entry/passive start ECU 111) can receive the response signal transmitted at the common timing, and thus the response speed with respect to the process request of the user can be enhanced.

An example of the transmission and reception timing of the request signal and the response signal when the locking of the door is requested by the user will now be described with reference to FIG. 10.

Figure 10:
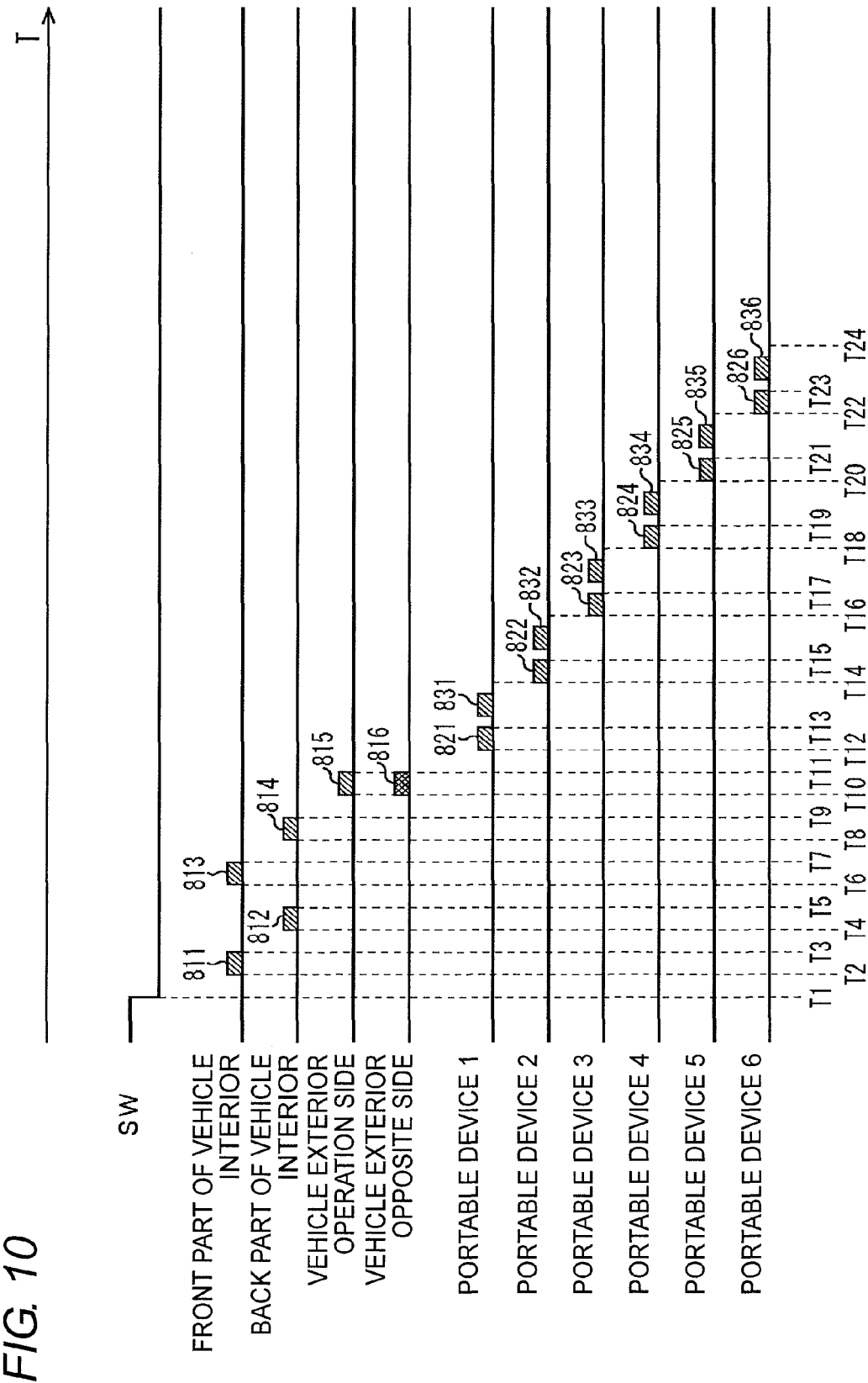
FIG. 10 is a diagram describing another example of transmission and reception timing of the request signal and the response signal.

The configuration of FIG. 10 is similar to FIG. 9. In the case of FIG. 10 as well, the sequence of the request signal transmission is similar to the case of FIG. 9 (case of unlocking). That is, a request signal 811 to a request signal 814 are transmitted two times each at the timing different from each other with respect to the front part of the vehicle interior and the back part of the vehicle interior so that the request signals do not collide and so as to be more reliably transmitted to the portable device 102. A request signal 815 is transmitted at the timing different from the timing described above so as not to collide with the request signal transmitted towards the vehicle interior with respect to the side the user inputs the instructing operation at the vehicle exterior. A disturbing signal 816 may be transmitted at the same timing as the request signal 815 to suppress the occurrence of collision between the request signals with respect to the side opposite to the side the user inputs the instructing operation at the vehicle exterior.

When receiving one of the request signals, the portable device 102-1 to the portable device 102-6 transmits the response signal two times each at the respective individual timing to suppress the occurrence of collision of the response signals and to more reliably perform the communication.

For example, the portable device 102-1 transmits a response signal 821 between time T12 and time T13 (first individual timing of portable device 102-1), and transmits a response signal 831 between time T13 and time T14 (second individual timing of portable device 102-1).

The portable device 102-2 transmits a response signal 822 between time T14 and time T15 (first individual timing of portable device 102-2), and transmits a response signal 832 between time T15 and time T16 (second individual timing of portable device 102-2).

The portable device 102-3 transmits a response signal 823 between time T16 and time T17 (first individual timing of portable device 102-3), and transmits a response signal 833 between time T17 and time T18 (second individual timing of portable device 102-3).

The portable device 102-4 transmits a response signal 824 between time T18 and time T19 (first individual timing of portable device 102-4), and transmits a response signal 834 between time T19 and time T20 (second individual timing of portable device 102-4).

The portable device 102-5 transmits a response signal 825 between time T20 and time T21 (first individual timing of portable device 102-5), and transmits a response signal 835 between time T21 and time T22 (second individual timing of portable device 102-5).

The portable device 102-6 transmits a response signal 826 between time T22 and time T23 (first individual timing of portable device 102-6), and transmits a response signal 836 between time T23 and time T24 (second individual timing of portable device 102-6).

The in-vehicle system 101 (passive entry/passive start ECU 111) receives the response signals transmitted in the above manner until time T24.

The portable device 102-1 to the portable device 102-6 thus transmit the response signals (response signal 821 to response signal 826, as well as response signal 831 to response signal 836) at individual timing different from each other with respect to the common request signals (request signal 811 to request signal 815) for all terminals. The occurrence of collision among the response signals is then suppressed. Therefore, the portable device 102-1 to the portable device 102-6 can more reliably transmit the response signals to the in-vehicle system 101 (passive entry/passive start ECU 111).

Since the portable device 102 is registered in the in-vehicle system 101 in advance and the above-described sequence is defined in advance, the portable device 102 can transmit the response signals at the respective individual timing, as described above, with respect to the request signals common to all portable devices 102 (not transmitted with respect to a specific portable device 102) transmitted by the in-vehicle system 101 (passive entry/passive start ECU 111). In other words, the in-vehicle system 101 (passive entry/passive start ECU 111) can reduce the number of transmissions of the request signal. Thus, the control system 100 can not only reduce the period necessary for communication but can also suppress the power consumption necessary for communication. That is, the control system 100 can more efficiently carry out the communication.

Similar to unlocking, the response time is also preferably short as possible for when locking, but the possibility the user requests other processes after locking as with unlocking is low. Therefore, the shortness of the response time is not as important in locking as in unlocking.

In locking, reliably performing the process (locking) with respect to the request is rather more important. For example, in the case of unlocking, even if unlocking is not performed with respect to the request of the user, the door merely does not open and the user just needs to make the request again. However, if locking is not performed with respect to the request of the user, the user may not notice of such fact. In such a case, the door may remain in the unlocked state.

To execute the process with respect to the request more reliably, the transmission and reception of the request signal and the response signal need to be more reliably carried out. For example, locking is not performed if the in-vehicle system 101 (passive entry/passive start ECU 111) fails in receiving the response signal. With the sequence in which each of the portable devices 102 transmits the response signal twice, the control system 100 can more reliably carry out the communication, and the process can be more reliably executed with respect to the request.

If the locking process is performed as requested when the portable device 102 exists in the vehicle interior, the user may not be able to perform the unlocking process due to so-called "confinement of key". To prevent this from occurring, the in-vehicle system 101 (passive entry/passive start ECU 111) does not execute the process until grasping where all portable devices 102 are positioned. More specifically, the in-vehicle system 101 (passive entry/passive start ECU 111) performs authentication and locking after the transmission period of the response signal is terminated (when time T24 is reached). The control system 101 then can more reliably prevent the locking of the door when the portable device 102 exists in the vehicle interior.

An example of the transmission and reception timing of the request signal and the response signal when the startup of engine is requested by the user will now be described with reference to FIG. 11.

Figure 11:
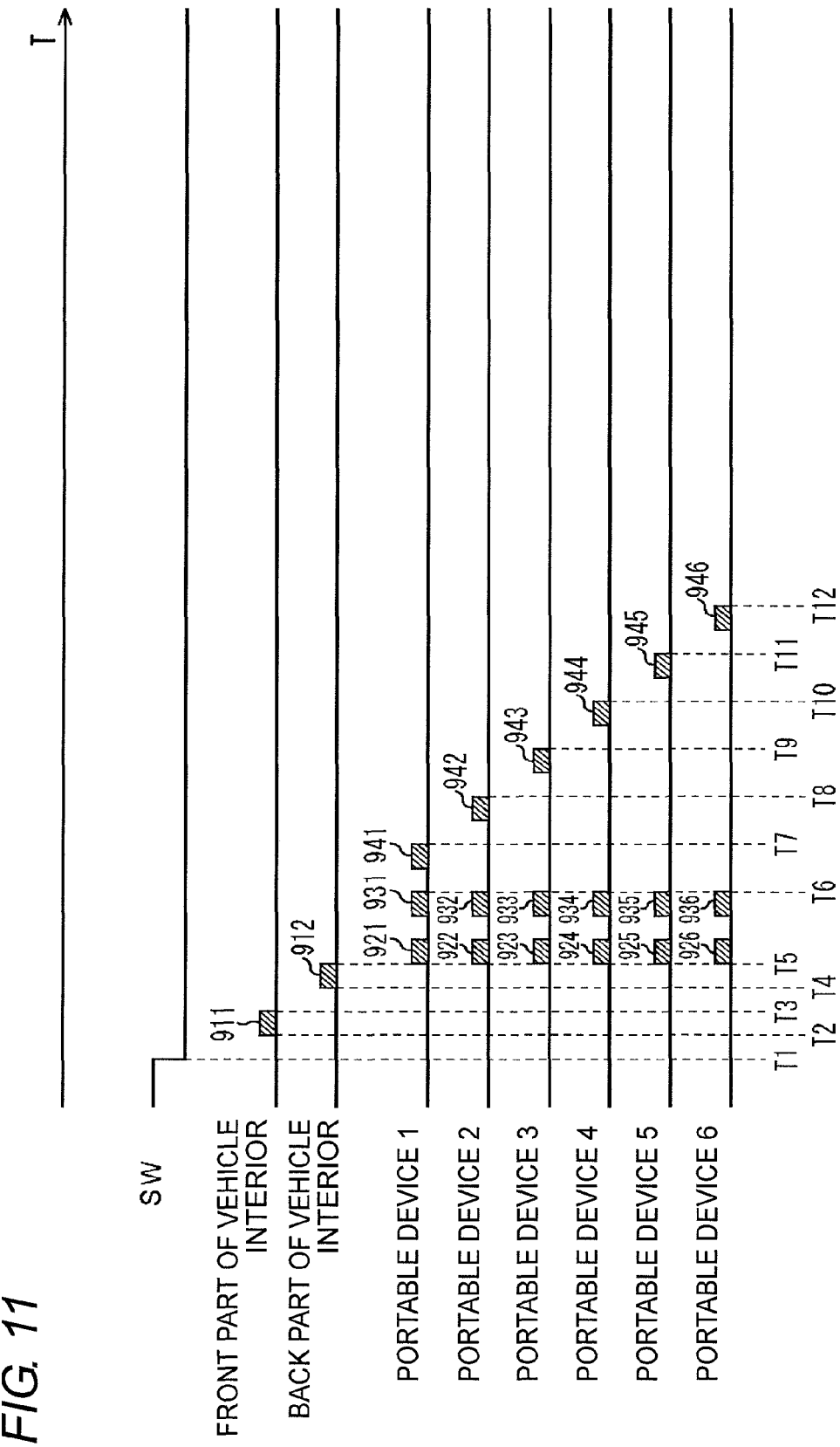
FIG. 11 is a diagram describing still another example of transmission and reception timing of the request signal and the response signal.

The configuration of FIG. 11 is similar to FIG. 9. When the startup of engine is requested, the request signal is transmitted one time each at the timing different from each other with respect to the front part of the vehicle interior and the back part of the vehicle interior so that the request signals do not collide (request signal 911 to request signal 912), as shown in FIG. 11.

In the case of engine startup, the response time is preferably short as possible, similar to the case of unlocking. Generally, the driving task is often carried out after the startup of the engine, and even if the engine is not started up with respect to the request, the user merely needs to re-operate the engine startup button 141 to make the request again. That is, in this case, the reduction of the response time is prioritized over the reliability of the process, similar to the case of unlocking.

In this case, therefore, the response signals are first simultaneously transmitted at the common timing from all portable devices 102, similar to the case of unlocking, and then again transmitted at the individual timing from each of the portable devices 102.

The engine may be started up even if the portable device 102 is positioned at the front part of the vehicle interior or the back part of the vehicle interior. However, the engine startup button 141 is generally arranged near the steering wheel 214, as shown in FIG. 2, and is often operated by the driver. In other words, the portable device 102 is in the front part of the vehicle interior in most cases. The response signal with respect to the request signal 911 transmitted to the front part of the vehicle interior is thus transmitted before the response signal with respect to the request signal 912 transmitted to the back part of the vehicle interior. That is, in the case of engine startup, two common timings, for the request signal 911 and for the request signal 912, are prepared. The individual timing is one time each, similar to the case of unlocking.

The portable device 102-1 to the portable device 102-6 transmit response signals at the first common timing to respond faster when receiving the request signal 911 for the front part of the vehicle interior. For example, at time T5, the portable device 102-1 transmits a response signal 921, the portable device 102-2 transmits a response signal 922, the portable device 102-3 transmits a response signal 923, the portable device 102-4 transmits a response signal 924, the portable device 102-5 transmits a response signal 925, and the portable device 102-6 transmits a response signal 926.

The portable device 102-1 to the portable device 102-6 then transmit response signals at the second common timing to respond faster when receiving the request signal 912 for the back part of the vehicle interior. To finish at time T6, the portable device 102-1 transmits a response signal 931, the portable device 102-2 transmits a response signal 932, the portable device 102-3 transmits a response signal 933, the portable device 102-4 transmits a response signal 934, the portable device 102-5 transmits a response signal 935, and the portable device 102-6 transmits a response signal 936.

In the normal case, the portable device 102 receives only either the request signal 911 or the request signal 912 depending on the position, and thus transmits the response signal at either the first common timing or the second common timing.

Thereafter, the portable device 102-1 to the portable device 102-6 transmit the response signals at the individual timing to suppress the occurrence of collision between the response signals. For example, the portable device 102-1 transmits a response signal 941 at the timing the transmission finishes at time T7. The portable device 102-2 transmits a response signal 942 at the timing the transmission finishes at time T8. The portable device 102-3 transmits a response signal 943 at the timing the transmission finishes at time T9. The portable device 102-4 transmits a response signal 944 at the timing the transmission finishes at time T10. The portable device 102-5 transmits a response signal 945 at the timing the transmission finishes at time T11. The portable device 102-6 transmits a response signal 946 at the timing the transmission finishes at time T12.

The in-vehicle system 101 (passive entry/passive start ECU 111) receives the response signals transmitted in the above manner until time T12.

The portable device 102-1 to the portable device 102-6 thus transmit the response signals (response signal 941 to response signal 946) at individual timing different from each other with respect to the common request signals (request signal 911 to request signal 912) for all terminals. The occurrence of collision among the response signals is then suppressed. Therefore, the portable device 102-1 to the portable device 102-6 can more reliably transmit the response signals to the in-vehicle system 101 (passive entry/passive start ECU 111).

Since the portable device 102 is registered in the in-vehicle system 101 in advance and the above-described sequence is defined in advance, the portable device 102 can transmit the response signals at the respective individual timing, as described above, with respect to the request signals common to all portable devices 102 (not transmitted with respect to a specific portable device 102) transmitted by the in-vehicle system 101 (passive entry/passive start ECU 111). In other words, the in-vehicle system 101 (passive entry/passive start ECU 111) can reduce the number of transmissions of the request signal. Thus, the control system 100 can not only reduce the period necessary for communication but can also suppress the power consumption necessary for communication. That is, the control system 100 can more efficiently carry out the communication.

Furthermore, the response speed with respect to the process request of the user can be enhanced compared to when the response signal is transmitted only at the individual timing since the portable device 102-1 to the portable device 102-6 transmit the response signals all at once at the common timing before the individual timing.

Therefore, the control system 100 applied with one or more embodiments of the present invention can suppress the occurrence of collision and more efficiently and more accurately perform the communication, and the response speed with respect to the process request of the user can be enhanced.

The examples of sequences have been described above, but at least each portable device needs to transmit the response signal at the individual timing and other sequences are arbitrary. The process requested by the user may be other than unlocking or locking of the door, and the startup of the engine.

In the sequences of locking the door and starting up the engine, when receiving one of the response signals, the in-vehicle system 101 (passive entry/passive start ECU 111) performs the process based on the corresponding response signal, but may perform a setting of invalidating the subsequently received response signals so as not to repeatedly execute the same process with respect to one request.

Furthermore, the in-vehicle system 101 (passive entry/passive start ECU 111) may determine the priority of the response signal transmission timing of each of the portable devices 102 based on the reception result of the response signal and the portable device registration information 391. The priority of the response signal transmission, that is, the individual timing can be updated in the next process by having the in-vehicle system 101 (passive entry/passive start ECU 111) generate the priority information 392 based on the reception result of the response signal.

For example, when performing the startup of the engine or the locking of the door after the door is unlocked, the user requesting for such processes has a high possibility of being the same person as the user who requested the unlocking of the door. At least the possibility the user different from the user who unlocked the door carrying the portable device 102 that is not in the communicable range of the in-vehicle system 101 when unlocking the door requests for such processes is low.

Specifically, the possibility the portable device 102 that did not transmit the response signal with respect to the request signal is not within the communicable range of the in-vehicle system 101 is high, and the possibility the user requesting for the next process carrying such a portable device 102 is low. In other words, the possibility the portable device 102 that transmitted the response signal with respect to the request signal exists in the communicable range of the in-vehicle system 101 and the user carrying such a portable device 102 requests for the next process is high.

Each of the portable devices 102 transmits the response signals at the individual timing, as described above. In the next process, the order of the individual timing may be changed so as to prioritize the portable device 102 having a high possibility of transmitting the response signal, and having the portable device 102 having a high possibility of not transmitting the response signal transmit the signal afterwards, so that the possibility the response signal can be transmitted faster can be increased.

Therefore, the control system 100 can more efficiently carry out the communication by changing the priority of the response signal in the next process according to the reception result of the response signal in the process for this time.

An example of a flow of processes executed by each device to implement the communication described above will now be described. First, the process executed by the in-vehicle system 101 will be described. The in-vehicle system 101 first accepts a request from the user. An example of a flow of request accepting process executed by the in-vehicle system 101 will be described with reference to the flowchart of FIG. 12.

When the request accepting process starts by turning ON the power of the in-vehicle system 101 and the like, the request accepting portion 351 controls the input unit 121 and the like to start the process request acceptance of accepting the process request instruction inputted by the user in step S201.

In step S202, the request accepting portion 351 determines whether or not the process request requesting for the execution of a predetermined process such as unlocking or locking of the door, the startup of the engine, and the like is accepted. The process proceeds to step S203 if determined that the process request is accepted.

In step S203, the integrated control portion 352 determines whether or not the process requested for execution by the accepted process request is the unlocking process of unlocking the door. The process proceeds to step S204 if determined as the unlocking process. In step S204, the unlock control part 361 executes the unlock control process. The details of the unlock control process will be described later. The process proceeds to step S208 when the unlock control process is finished.

If determined that the execution of the unlocking process is not requested by the accepted process request in step S203, the process proceeds to step S205. In step S205, the integrated control portion 352 determines whether or not the process requested for execution by the accepted process request is the locking process of locking the door. The process proceeds to step S206 if determined as the locking process. In step S206, the lock control part 362 executes the lock control process. The details of the lock control process will be described later. The process proceeds to step S208 when the lock control process is finished.

If determined that the execution of the locking process is not requested by the accepted process request in step S205, determination is made that the execution of the startup process of starting up the engine is requested, and the process proceeds to step S207. In step S207, the startup control part 363 executes the startup control process. The details of the startup control process will be described later. The process proceeds to step S208 when the startup control process is finished.

If determined that the process request is not accepted in step S202, the process proceeds to step S208. In step S208, the request accepting portion 351 determines whether or not to terminate the request accepting process. If determined not to terminate the request accepting process, the process returns to step S202 and the subsequent processes are repeated. If determined to terminate the request accepting process in step S208, the process request acceptance is terminated and the request accepting process is terminated.

An example of a detailed flow of the unlock control process executed in step S204 of FIG. 12 will now be described with reference to the flowchart of FIG. 13. The unlock control process is executed by each part of the process control portion 353 controlled by the unlock control part 361.

When the unlock control process starts, the request signal generation part 371 generates an unlock request signal, namely the request signal 393 in the case where the request of the user is unlocking in step S221. In step S222, the request signal transmission part 372 controls the transmitting portion 321 of the communication unit 303 and transmits the unlock request signal through the transmission antenna 122. After the unlock request signal is transmitted and notification is made that a predetermined time is reached by the timing part 373, the response signal reception part 374 controls the receiving portion 322 of the communication unit 303 to start the reception (standby) of the response signal through the reception antenna 123 in step S223.

In step S224, the timing part 373 determines whether or not a predetermined period has elapsed. If determined that the predetermined period has not elapsed, the process proceeds to step S225. In step S225, the response signal reception part 374 determines whether or not the response signal is received. If determined that the response signal is not received, the process returns to step S224, and the subsequent processes are repeated. That is, the process control portion 353 is in the reception standby state of waiting for the response signal being transmitted until the response signal is received or until the predetermined period has elapsed. If determined that the response signal is received in step S225, the process proceeds to step S226. The response signal reception part 374 continues the reception (standby) of the response signal and appropriately receives the transmitted response signal even while the processes after step S226 are being executed in parallel thereto.

In step S226, the analyzing part 375 analyzes the received response signal. In step S227, the condition determining part 376 determines whether or not an invalid setting is performed by the invalid setting part 379. If determined that the invalid setting is not performed, the process proceeds to step S228.

In step S228, the condition determining part 376 determines whether or not the portable device 102 of the transmission source of the response signal exists at the vehicle exterior. If determined that the request signal 393 corresponding to the response signal is outputted through the LF antenna 151 or the LF antenna 152 and that the portable device 102 of the transmission source of the response signal exists at the vehicle exterior as a result of analyzing the information contained in the response signal, the process proceeds to step S229.

In step S229, the authentication part 377 performs the authentication process of the portable device 102 using the identification information of the portable device 102 contained in the response signal and the portable device registration information 391. In step S230, the authentication part 377 determines whether or not the authentication of the portable device 102 by the authentication process is successful. If determined that the portable device 102 of the transmission source of the response signal is a legitimate portable device 102 registered in advance in the in-vehicle system 101 by the authentication process, the process proceeds to step S231.

In step S231, the process executing part 378 controls the vehicle control ECU 125, and causes the lock/unlock actuator 127 to unlock the door. After the door is unlocked, the invalid setting part 379 performs the invalid setting in step S232 to invalidate other response signals. The process proceeds to step S233 after the invalid setting is performed.

If determined that the setting is not invalid in step S227, the process proceeds to step S233. Furthermore, if determined that the request signal 393 corresponding to the response signal is outputted through the LF antenna 153 to the LF antenna 155 and that the portable device 102 of the transmission source of the response signal exists at the vehicle interior as a result of analyzing the information contained in the response signal in step S228, the process proceeds to step S233. If determined that the authentication failed in step S230, the process proceeds to step S233.

In step S233, the process control portion 353 determines whether or not an unprocessed received response signal exists. If determined that the unprocessed received response signal exists, the process returns to step S226, and the subsequent processes are repeated with the next received response signal as a processing target. If determined that the unprocessed received response signal does not exist in step S233, the process returns to step S224 to the reception standby state of the response signal, and the subsequent processes are repeated.

If determined that the predetermined period has elapsed in step S224, the process proceeds to step S234. In step S234, the priority setting part 380 performs a priority setting based on the reception result of the response signal.

Figure 12:
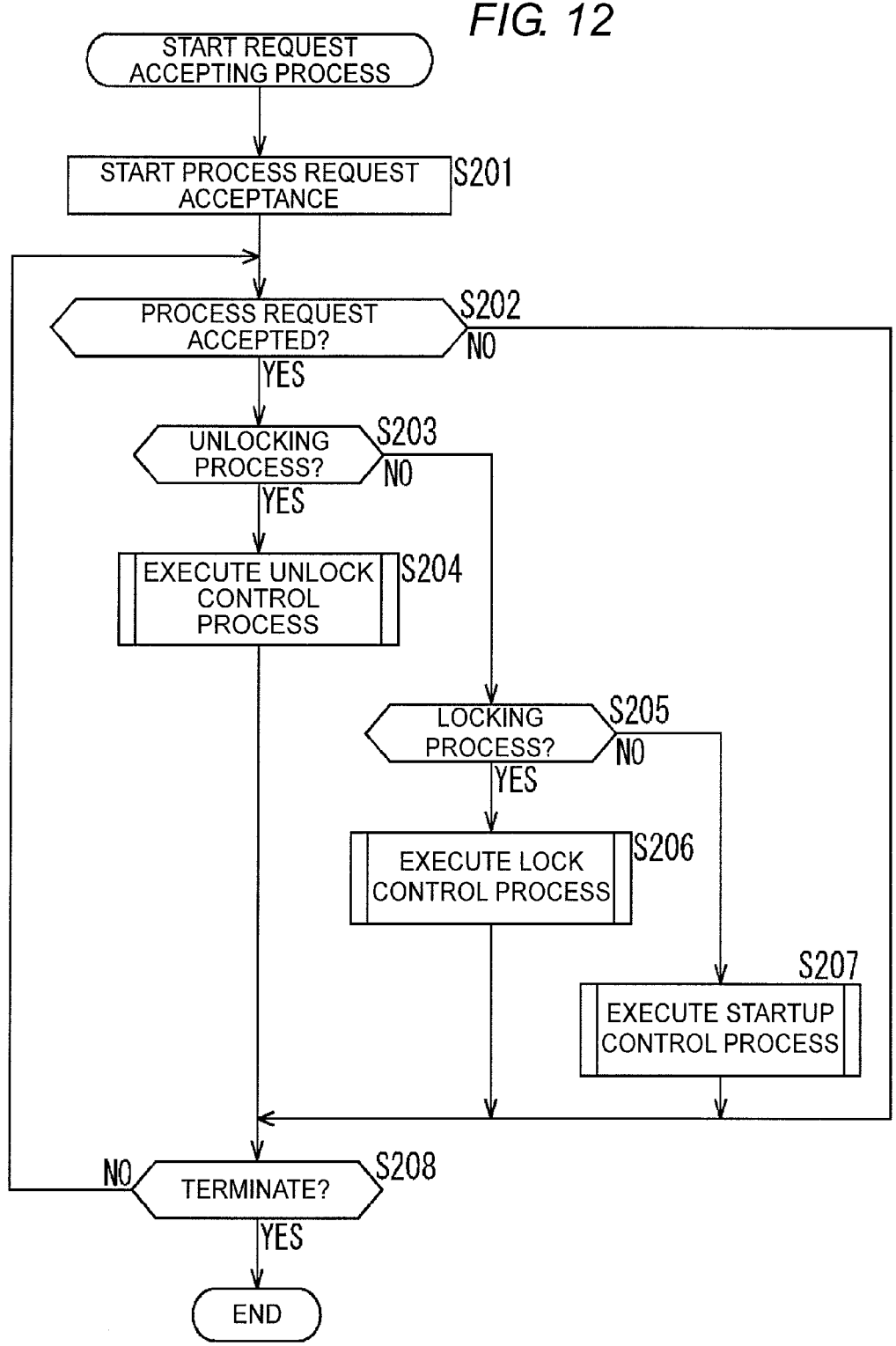
FIG. 12 is a flowchart describing an example of a flow of a request accepting process.
Figure 13:
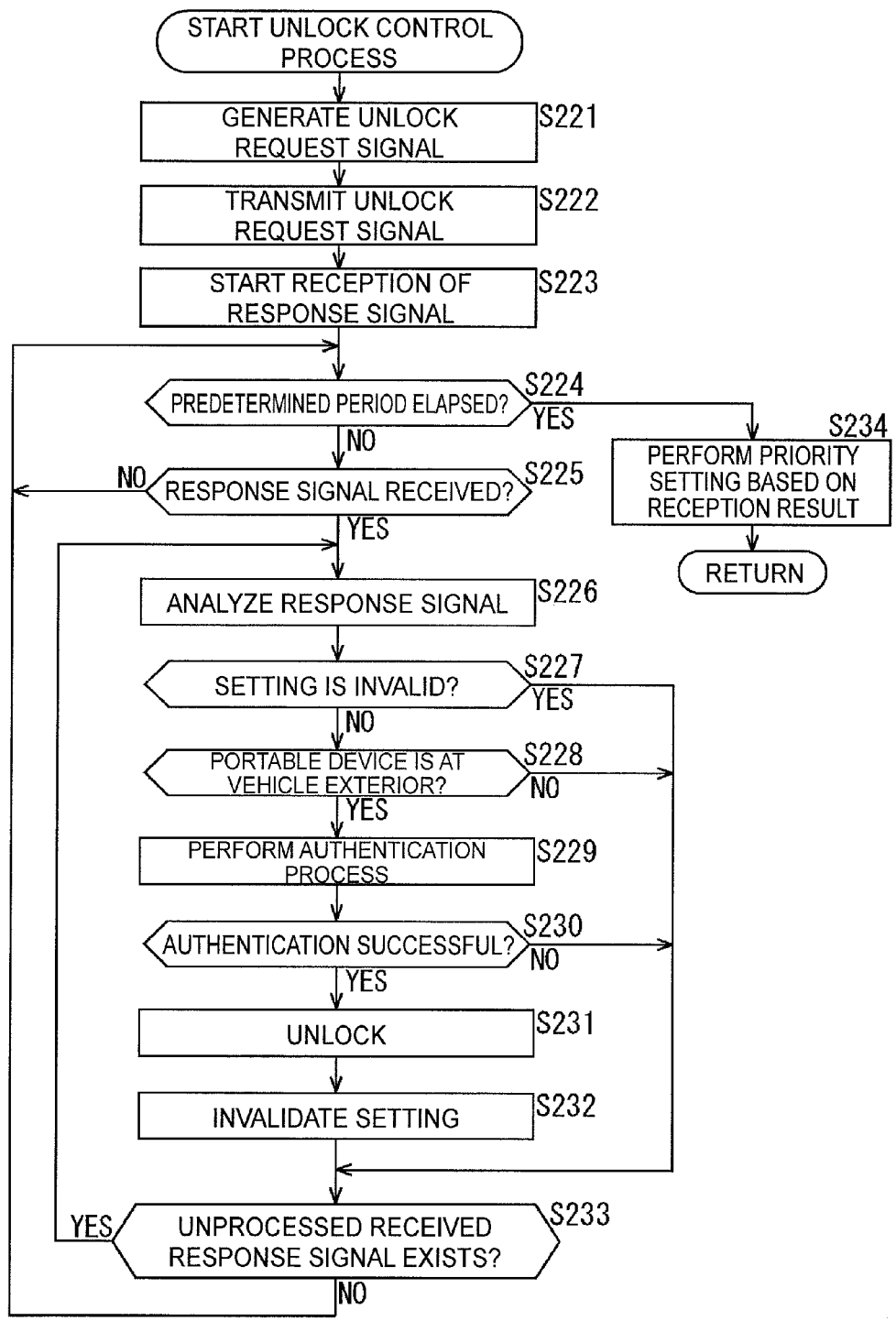
FIG. 13 is a flowchart describing an example of a flow of an unlock control process.

After the process of step S234 is finished, the unlock control process is terminated, and the process returns to step S204 of FIG. 12 to repeat the processes after step S208.

Figure 14:
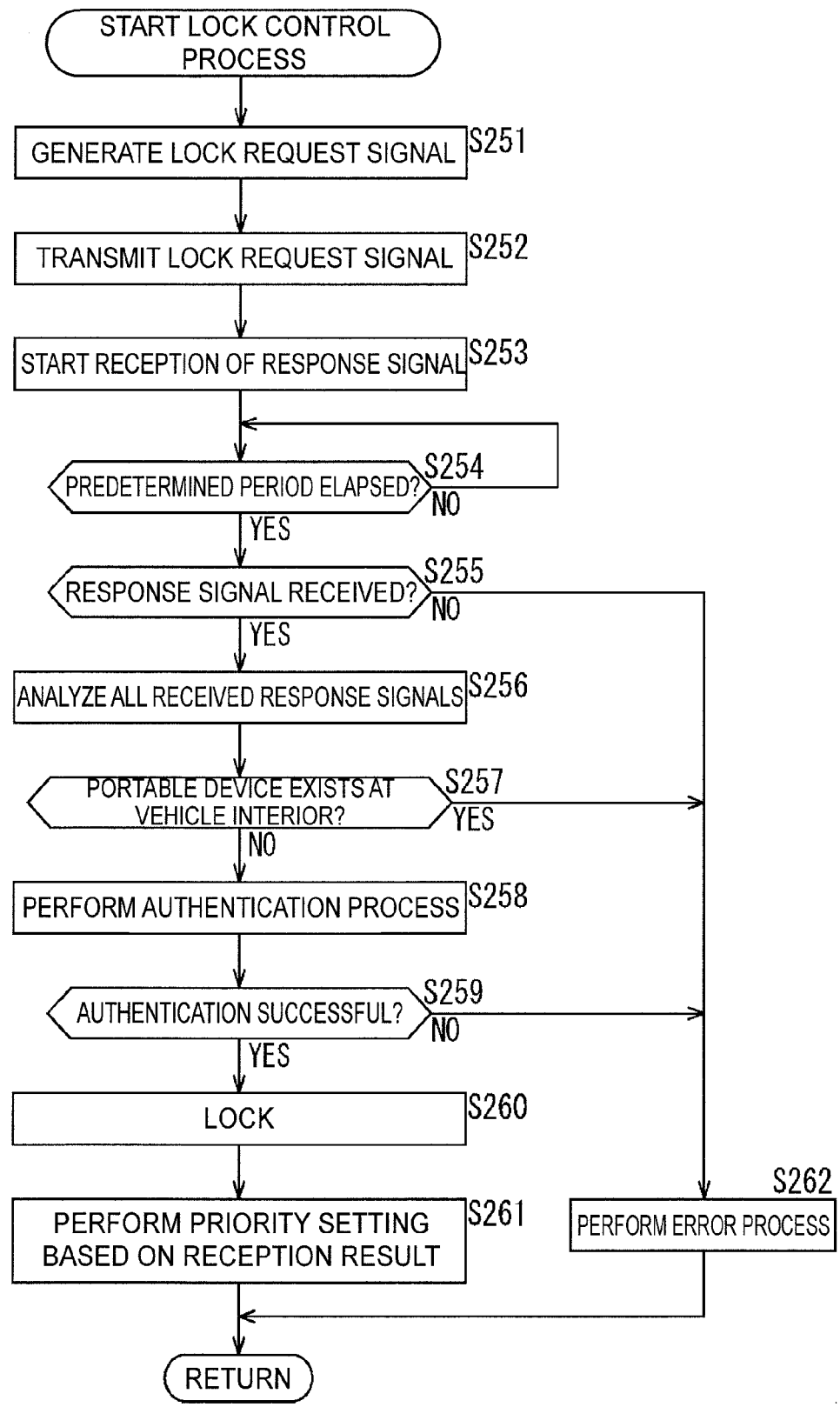
FIG. 14 is a flowchart describing an example of a flow of a lock control process.

An example of a detailed flow of the lock control process executed in step S206 of FIG. 12 will now be described with reference to the flowchart of FIG. 14. The lock control process is executed by each part of the process control portion 353 controlled by the lock control part 362.

When the lock control process starts, the request signal generation part 371 generates a lock request signal, namely the request signal 393 in the case where the request of the user is locking in step S251. In step S252, the request signal transmission part 372 controls the transmitting portion 321 of the communication unit 303 and transmits the lock request signal through the transmission antenna 122. After the lock request signal is transmitted and notification is made that a predetermined time is reached by the timing part 373, the response signal reception part 374 controls the receiving portion 322 of the communication unit 303 to start the reception (standby) of the response signal through the reception antenna 123 in step S253.

In step S254, the timing part 373 determines whether or not a predetermined period has elapsed, and waits in the reception standby state until determined that the predetermined period has not elapsed and appropriately receives the response signal being transmitted. If determined that the predetermined period, which is defined in advance as a period of receiving the response signal, has elapsed in step S254, the process proceeds to step S255.

In step S225, the response signal reception part 374 determines whether or not the response signal is received during the predetermined period. If determined that the response signal is received, the process proceeds to step S256.

In step S256, the analyzing part 375 analyzes each received response signal. In step S257, the condition determining part 376 determines whether or not the portable device 102 of the transmission source of the response signal exists at the vehicle interior in step S257. If determined that all request signals 393 corresponding to the response signals is outputted through the LF antenna 151 or the LF antenna 152 and that the portable device 102 does not exist at the vehicle interior as a result of analyzing the information contained in each of the response signals, the process proceeds to step S258.

In step S258, the authentication part 377 performs the authentication process of each of the portable devices 102 using the identification information of the portable device 102 contained in each of the response signals and the portable device registration information 391. In step S259, the authentication part 377 determines whether or not the authentication of at least one portable device 102 by the authentication process is successful. If determined that a legitimate portable device 102 registered in advance in the in-vehicle system 101 exists (i.e., authentication is successful) by the authentication process, the process proceeds to step S260.

In step S260, the process executing part 378 controls the vehicle control ECU 125, and causes the lock/unlock actuator 127 to lock the door. After the door is locked, the priority setting part 380 performs the priority setting based on the reception result of the response signal in step S261. After the process of step S261 is finished, the lock control process is terminated, and the process returns to step S206 of FIG. 12 to repeat the processes after step S208.

If determined that the response signal is not received during the predetermined period in step S255, the process proceeds to step S262. Furthermore, if determined that the request signal 393 corresponding to the response signal includes a request signal outputted through the LF antenna 153 to the LF antenna 155 and that the portable device 102 exists at the vehicle interior as a result of analyzing the information contained in each of the response signals in step S257, the process proceeds to step S262. If determined that the authentication failed in step S259, the process proceeds to step S262.

In step S262, the process executing part 378 performs an error process. After the process of step S262 is finished, the lock control process is terminated and the process returns to step S206 of FIG. 12 to repeat the processes after step S208.

Figure 15:
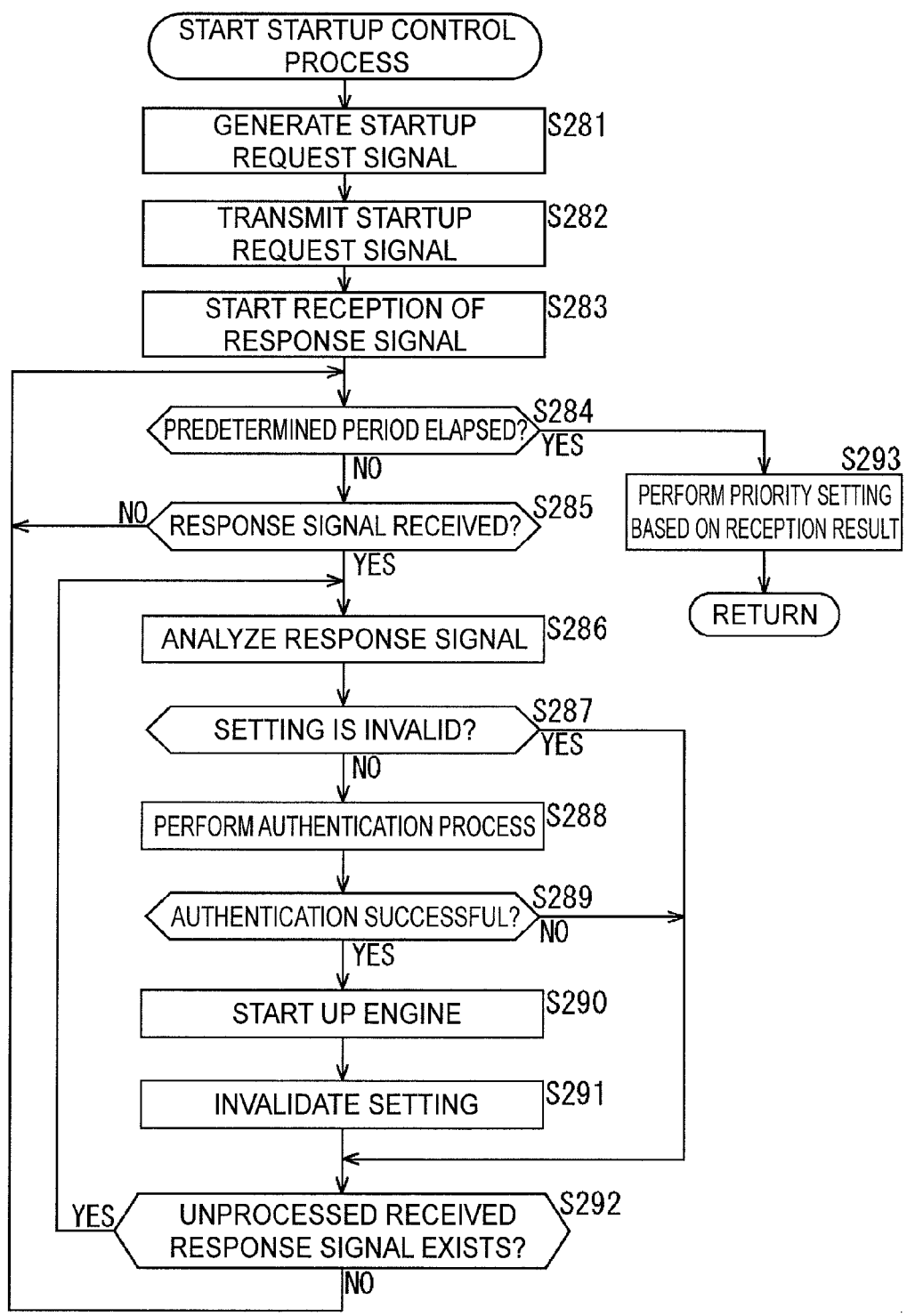
FIG. 15 is a flowchart describing an example of a flow of a startup control process.

An example of a detailed flow of the startup control process executed in step S207 of FIG. 12 will now be described with reference to the flowchart of FIG. 15. The startup control process is executed by each part of the process control portion 353 controlled by the startup control part 363.

When the startup control process starts, the request signal generation part 371 generates a startup request signal, namely the request signal 393 in the case where the request of the user is engine startup in step S281. In step S282, the request signal transmission part 372 controls the transmitting portion 321 of the communication unit 303 and transmits the startup request signal through the transmission antenna 122 (LF antenna 151 and LF antenna 152). After the startup request signal is transmitted and notification is made that a predetermined time is reached by the timing part 373, the response signal reception part 374 controls the receiving portion 322 of the communication unit 303 to start the reception (standby) of the response signal through the reception antenna 123 in step S283.

In step S284, the timing part 373 determines whether or not a predetermined period has elapsed. If determined that the predetermined period has not elapsed, the process proceeds to step S285. In step S285, the response signal reception part 374 determines whether or not the response signal is received. If determined that the response signal is not received, the process returns to step S284, and the subsequent processes are repeated. That is, the process control portion 353 is in the reception standby state of waiting for the response signal being transmitted until the response signal is received or until the predetermined period has elapsed. If determined that the response signal is received in step S285, the process proceeds to step S286. The response signal reception part 374 continues the reception (standby) of the response signal and appropriately receives the transmitted response signal even while the processes after step S286 are being executed in parallel thereto.

In step S286, the analyzing part 375 analyzes the received response signal. In step S287, the condition determining part 376 determines whether or not an invalid setting is performed by the invalid setting part 379. If determined that the invalid setting is not performed, the process proceeds to step S288.

In step S288, the authentication part 377 performs the authentication process of the portable device 102 using the identification information of the portable device 102 contained in the response signal and the portable device registration information 391. In step S289, the authentication part 377 determines whether or not the authentication of the portable device 102 by the authentication process is successful. If determined that the portable device 102 of the transmission source of the response signal is a legitimate portable device 102 registered in advance in the in-vehicle system 101 by the authentication process, the process proceeds to step S290.

In step S290, the process executing part 378 controls the vehicle control ECU 125, and starts up the engine. The process executing part 378 also controls the vehicle control ECU 125 and causes the electronic steering lock 126 to have the steering wheel 214 movable with the engine startup. After the engine is started up, the invalid setting part 379 performs the invalid setting in step S291 to invalidate other response signals. The process proceeds to step S292 after the invalid setting is performed.

If determined that the setting is not invalid in step S287, the process proceeds to step S292. If determined that the authentication failed in step S289, the process proceeds to step S292.

In step S292, the process control portion 353 determines whether or not an unprocessed received response signal exists. If determined that the unprocessed received response signal exists, the process returns to step S286, and the subsequent processes are repeated with the next received response signal as a processing target. If determined that the unprocessed received response signal does not exist in step S292, the process returns to step S284 to the reception standby state of the response signal, and the subsequent processes are repeated.

If determined that the predetermined period has elapsed in step S284, the process proceeds to step S293. In step S293, the priority setting part 380 performs a priority setting based on the reception result of the response signal.

After the process of step S293 is finished, the startup control process is terminated, and the process returns to step S207 of FIG. 12 to repeat the processes after step S208.

The passive entry/passive start ECU 111 performs the control process corresponding to the requested process as described above.

The process executed by the portable device 102 will now be described. First, an example of a flow of the process of receiving the request signal will be described with reference to the flowchart of FIG. 16.

When the request signal receiving process starts, the request signal receiving portion 511 starts the reception (standby) of the request signal transmitted by the in-vehicle system 101 in step S401. In step S402, the request signal receiving portion 511 determines whether or not the request signal is received. The process proceeds to step S403 if determined that the request signal is received.

In step S403, the analyzing portion 512 analyzes the received request signal. In step S404, the integrated control portion 513 determines whether the received request signal is an unlock request signal. If determined as the unlock request signal identified as the request signal corresponding to the request for unlocking the door, the process proceeds to step S405.

In step S405, the unlock control part 521 performs the unlock control process. The details of the unlock control process will be described later. After the unlock control process is terminated, the process proceeds to step S409.

If determined as not the unlock request signal in step S404, the process proceeds to step S406. In step S406, the integrated control portion 513 determines whether the received request signal is a lock request signal. If determined as the lock request signal identified as the request signal corresponding to the request for locking the door, the process proceeds to step S407.

In step S407, the lock control part 522 performs the lock control process. The details of the lock control process will be described later. After the lock control process is terminated, the process proceeds to step S409.

If determined as not the lock request signal in step S406, the received signal is assumed as the startup request signal identified as the request signal corresponding to the request for starting up the engine, and the process proceeds to step S408. In step S408, the startup control part 523 performs the startup control process. The details of the startup control process will be described later. After the startup control process is terminated, the process proceeds to step S409.

Furthermore, if determined that the request signal is not received in step S402, the process proceeds to step S409.

In step S409, the integrated control portion 513 determines whether or not to terminate the request signal receiving process. If determined not to terminate, the process returns to step S402, and the subsequent processes are repeated.

The request signal receiving process is terminated if determined to terminate the process in step S409.

An example of a detailed flow of the unlock control process executed in step S405 of FIG. 16 will be described with reference to the flowchart of FIG. 17. The unlock control process is executed by each part of the process control portion 514 controlled by the unlock control part 521.

When the unlock control process starts, the timing setting part 531 sets the response timing based on the response timing information 541, the analysis result of the request signal (priority information contained in request signal), and the like in step S421. In step S422, the response signal generation part 532 generates the response signal 543 using the analysis result of the request signal, and the like.

In step S423, the timing part 533 performs the timing process, determines whether or not the common timing, and waits until determined as the common timing. If determined as the common timing, the process proceeds to step S424. In step S424, the response signal transmission part 534 performs the first transmission of the response signal 543.

In step S425, the timing part 533 performs the timing process, determines whether or not the individual timing, and waits until determined as the individual timing. If determined as the individual timing, the process proceeds to step S426. In step S426, the response signal transmission part 534 performs the second transmission of the response signal.

Figure 16:
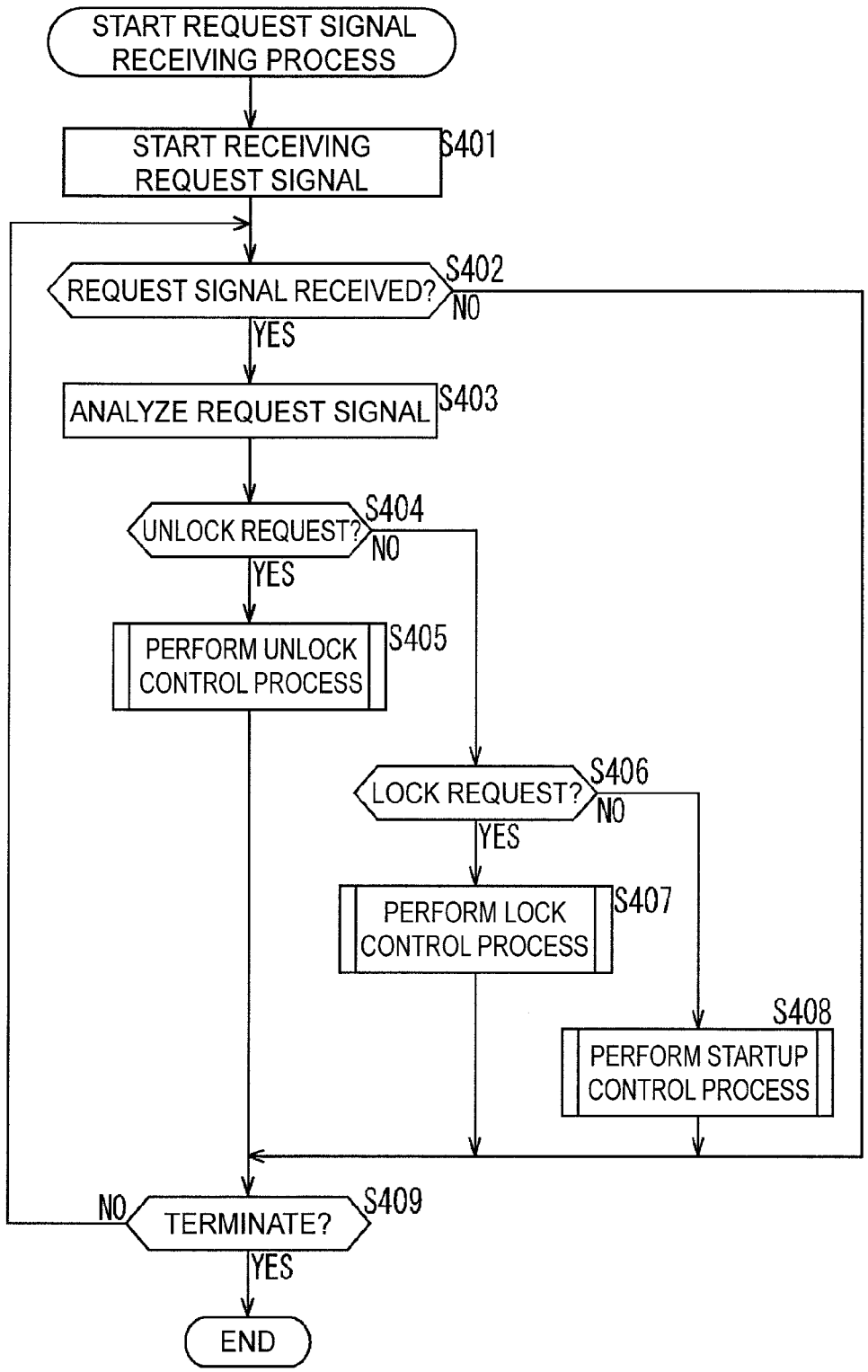
FIG. 16 is a flowchart describing an example of a flow of a request signal receiving process.
Figure 17:
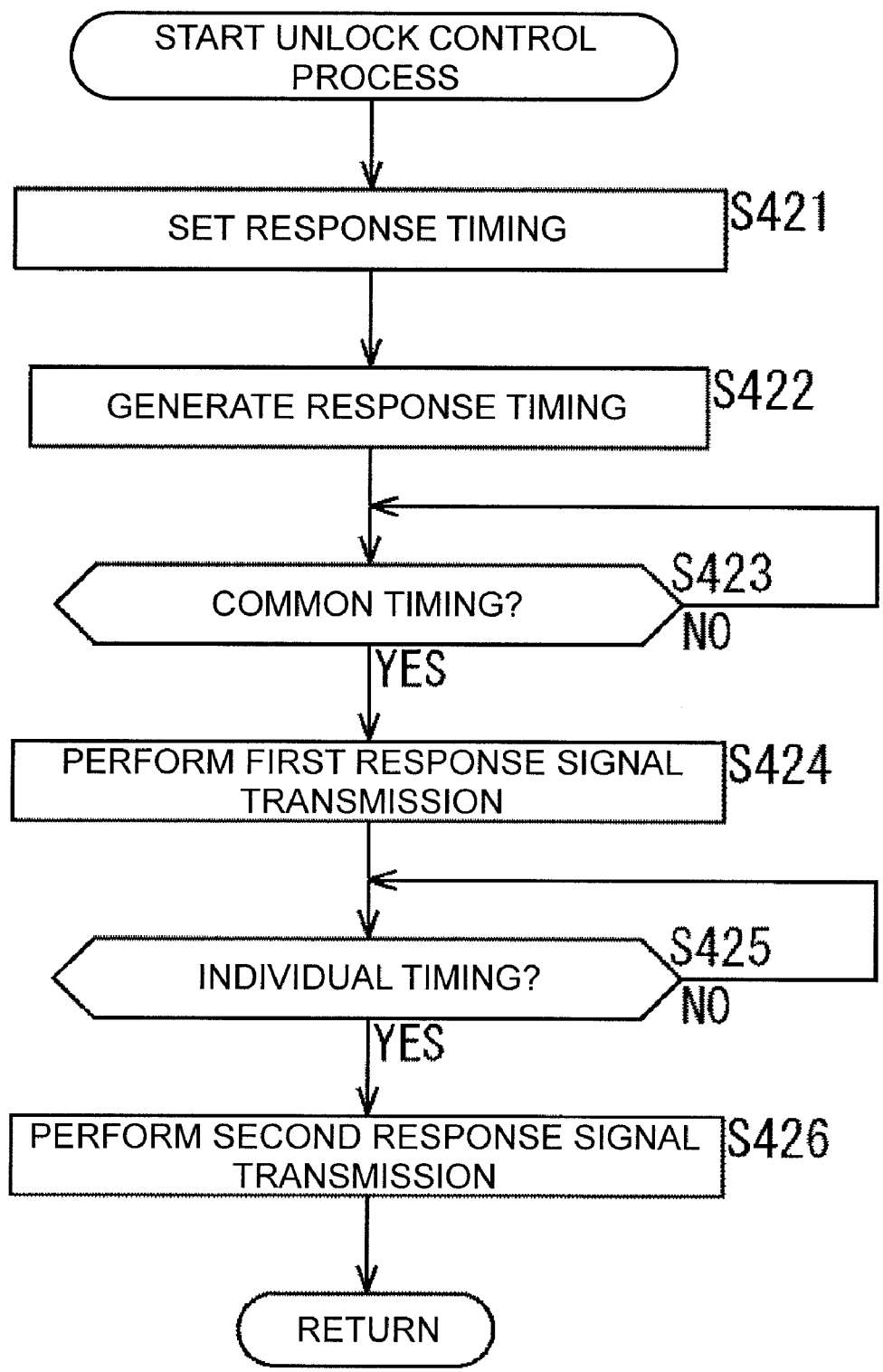
FIG. 17 is a flowchart describing an example of a flow of an unlock control process.

After the process of step S426 is finished, the unlock control process is terminated, and the process returns to step S405 of FIG. 16 to repeat the processes after step S409.

Figure 18:
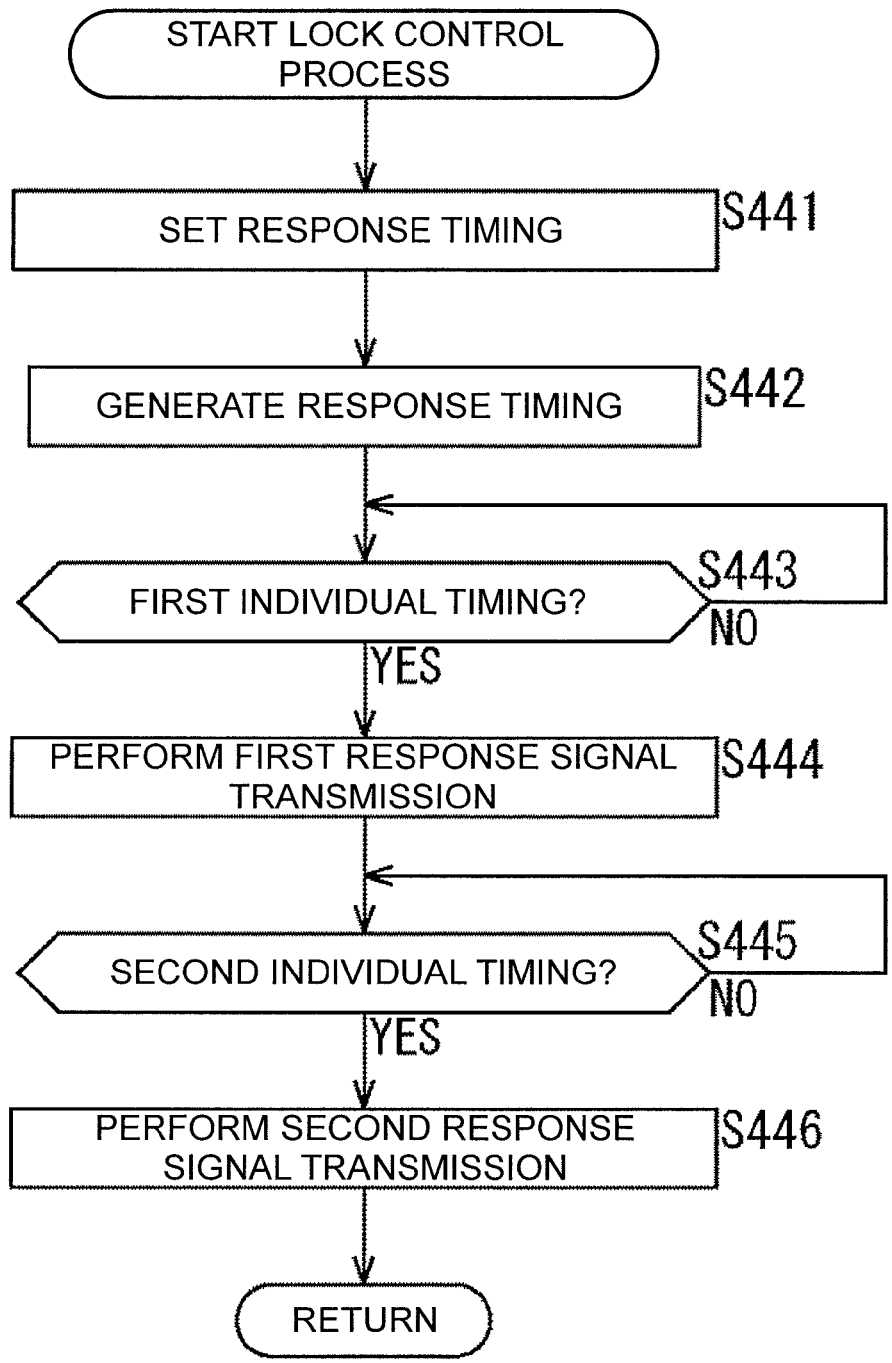
FIG. 18 is a flowchart describing an example of a flow of a lock control process.

An example of a detailed flow of the lock control process executed in step S407 of FIG. 16 will be described with reference to the flowchart of FIG. 18. The lock control process is executed by each part of the process control portion 514 controlled by the lock control part 522.

When the lock control process starts, the timing setting part 531 sets the response timing based on the response timing information 541, the analysis result of the request signal (priority information contained in request signal), and the like in step S441. In step S442, the response signal generation part 532 generates the response signal 543 using the analysis result of the request signal, and the like.

In step S443, the timing part 533 performs the timing process, determines whether or not the first individual timing, and waits until determined as the first individual timing. When determined as the first individual timing, the process proceeds to step S444. In step S444, the response signal transmission part 534 performs the first transmission of the response signal 543.

In step S445, the timing part 533 performs the timing process, determines whether or not the second individual timing, and waits until determined as the second individual timing. When determined as the second individual timing, the process proceeds to step S446. In step S446, the response signal transmission part 534 performs the second transmission of the response signal.

After the process of step S446 is finished, the lock control process is terminated, and the process returns to step S407 of FIG. 16 to repeat the processes after step S409.

An example of a detailed flow of the startup control process executed in step S408 of FIG. 16 will be described with reference to the flowchart of FIG. 19. The startup control process is executed by each part of the process control portion 514 controlled by the startup control part 523.

When the startup control process starts, the timing setting part 531 sets the response timing based on the response timing information 541, the analysis result of the request signal (priority information contained in request signal), and the like in step S461. In step S462, the response signal generation part 532 generates the response signal 543 using the analysis result of the request signal, and the like.

In step S463, the timing part 533 determines whether or not the received request signal is a request signal transmitted from the LF antenna 153 for the front part of the vehicle interior based on the analysis result of the request signal, and the like.

If determined as the request signal transmitted from the LF antenna 153 for the front part of the vehicle interior, the process proceeds to step S464. In step S464, the timing part 533 performs the timing process, determines whether or not the first common timing, and waits until determined as the first common timing. When determined as the first common timing, the process proceeds to step S466.

In step S463, if determined as the request signal transmitted from the LF antenna 154 for the back part of the vehicle interior, the process proceeds to step S465. In step S465, the timing part 533 performs the timing process, determines whether or not the second common timing, and waits until determined as the second common timing. When determined as the second common timing, the process proceeds to step S466.

In step S466, the response signal transmission part 534 performs the first transmission of the response signal 543.

In step S467, the timing part 533 performs the timing process, determines whether or not the individual timing, and waits until determined as the individual timing. If determined as the individual timing, the process proceeds to step S468. In step S468, the response signal transmission part 534 performs the second transmission of the response signal.

Figure 19:
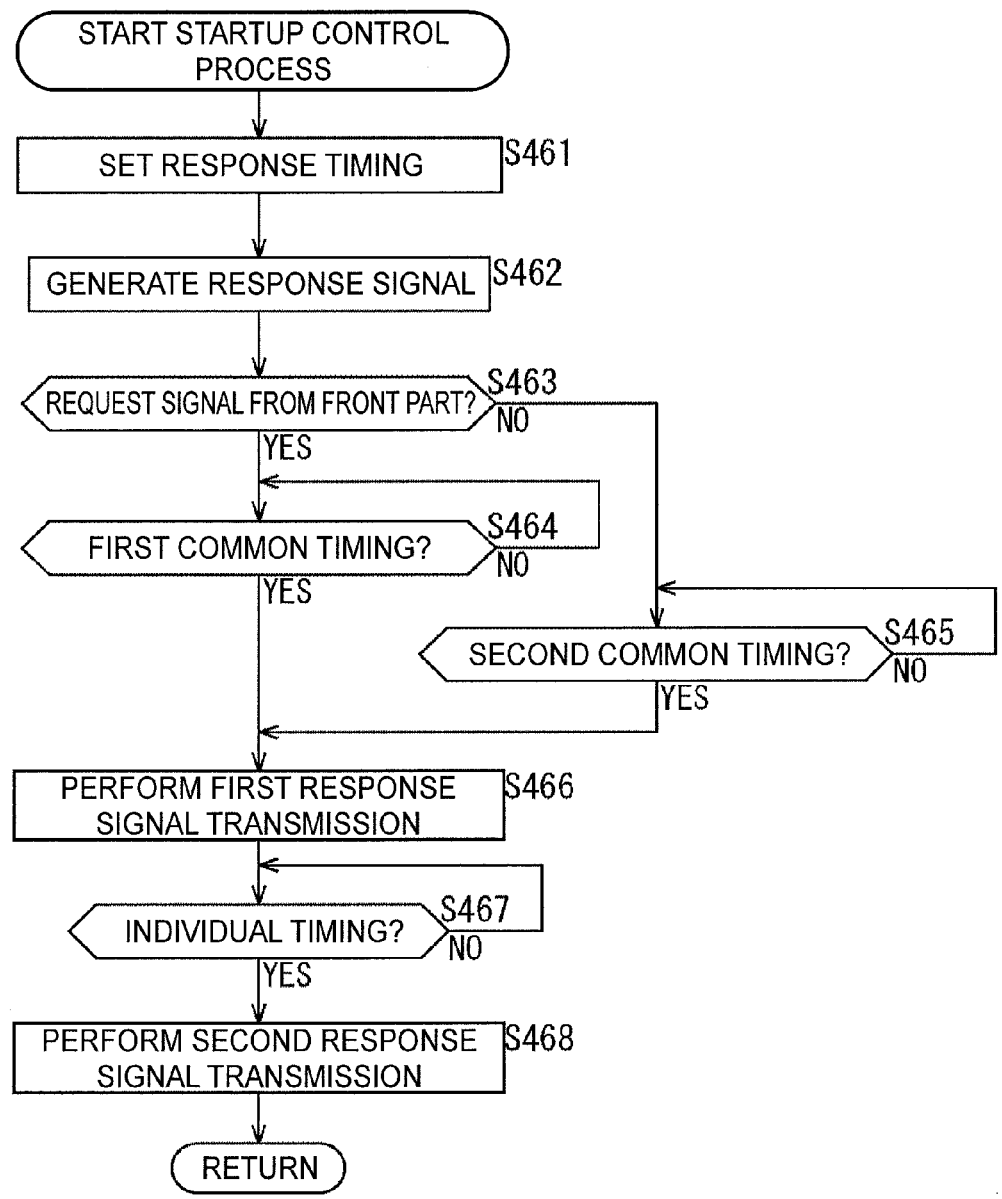
FIG. 19 is a flowchart describing an example of a flow of a startup control process.

After the process of step S468 is finished, the startup control process is terminated, and the process returns to step S408 of FIG. 19 to repeat the processes after step S409.

The portable device 102 thus generates the response signal 543 corresponding to the request signal in the sequence corresponding to each process, and transmits the same to the in-vehicle system 101. The control system 100 thus can suppress the occurrence of collision, and more efficiently and accurately perform the communication.

The series of processes may be executed by hardware, or may be executed by software. When executing the series of processes by software, the program constituting the software is installed from a network or a recording medium.

As shown in FIGS. 1 and 5, apart from the device main body, the recording medium is not only configured by a removable medium 131 or a removable medium 425 including a magnetic disk (including a flexible disk), an optical disk (including a CD-ROM (Compact Disc-Read Only memory), a DVD (Digital Versatile Disk)), a magnetic optical disk (including a MD (Mini-Disk) (registered trademark)), or a semiconductor memory recorded with a program distributed to distribute the program to each of the devices of the control system 100, and may be configured by the ROM 311 or the ROM 431, the flash memory, the hard disk, and the like recorded with the program to be distributed to a manager by being incorporated in advance in the device main body.

The program executed by the computer may be a program in which the processes are performed in time-series along the order described in the present specification, or may be a program in which the processes are performed in parallel or at the necessary timing such as when called out.

In the present specification, the steps describing the program recorded in the recording medium obviously include the processes performed in time-series along the described order, but also include the processes not necessarily processed in time-series but are executed in parallel or individually.

In the present specification, the system represents the entire device configured by a plurality of devices.

The configuration described as one device (or processing unit) above may be divided, and configured as a plurality of devices (or processing units). The configuration described as a plurality of devices (or processing units above may be collected and configured as one device (or processing unit). The configurations other than the above may be added to the configuration of each of the devices (or each of the processing units). Furthermore, if the configuration and the operation as the entire system are substantially the same, one part of the configuration of a certain device (or processing unit) may be included in the configuration of another device (or another processing unit). That is, the embodiments of the present invention are not limited to the above-described embodiments, and various modifications can be made without deviating from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A control system comprising:
    a control device provided in a vehicle that performs a control of a predetermined process, and
    a plurality of portable communication devices for communicating with the control device;
    wherein the control device includes:
        a first transmission unit for transmitting a request signal requesting for transmission of a response signal to at least one of the plurality of portable communication devices,
        a first reception unit for receiving the response signal transmitted through a predetermined procedure from at least one of the plurality of portable communication devices in response to the request signal transmitted by the first transmission unit,
        an authentication unit for performing authentication of at least one of the plurality of portable communication devices using identification information of at least one of the plurality of portable communication devices contained in the response signal received by the first reception unit and identification information of at least one of the plurality of portable communication devices registered in advance, and
        a process executing unit for executing the predetermined process when the authentication of at least one of the plurality of portable communication devices by the authentication unit is successful; and
    wherein at least one of the plurality of portable communication devices includes:
        a first storage unit for storing transmission scheduled time information indicating a time scheduled to transmit the response signal assigned to at least one of the plurality of portable communication devices,
        a second reception unit for receiving the request signal transmitted from the first transmission unit, and
        a second transmission unit for performing a first transmission operation of transmitting the response signal corresponding to the request signal received by the second reception unit to the control device at a time common with the other portable communication devices after receipt of the request signal, and a second transmission operation of transmitting the response signal to the control device at a time different from times assigned to other portable communication devices after completion of the first transmission operation based on the transmission scheduled time information stored in the first storage unit.

2. The control system according to claim 1, wherein
the communication device further includes a timing unit for performing a timing process of measuring time and specifying current time; and
the second transmission unit transmits the response signal after elapse of a predetermined time from when the request signal is received by the second reception unit based on the timing process by the timing unit.

3. The control system according to claim 1, wherein the second transmission unit performs transmission of the response signal twice at a time different from the times assigned to the other communication devices based on the transmission scheduled time information stored in the first storage unit.

4. The control system according to claim 1, wherein the second transmission unit performs a first transmission of the response signal at a time corresponding to the request signal received by the second reception unit of a plurality of times common with the other communication devices, and performs a second transmission of the response signal at a time different from the times assigned to the other communication devices based on the transmission scheduled time information stored in the first storage unit.

5. The control system according to claim 1, wherein the communication device further includes a time setting unit for setting a time for the second transmission unit to transmit the response signal based on the transmission scheduled time information stored in the first storage unit and information indicating priority in the transmission of the response signal contained in the request signal received by the second reception unit.

6. The control system according to claim 1, wherein the first reception unit receives the response signal for a predetermined period including all times scheduled to transmit the response signal assigned to each of the communication devices.

7. The control system according to claim 6, wherein the control device further includes an invalid setting unit for performing an invalid setting of invalidating other response signals received in the predetermined period when authentication of the communication device by the authentication unit, which is a transmission source of the response signal received first by the first reception unit, is successful.

8. The control system according to claim 1, wherein the control device further includes:
a priority determining unit for determining a priority in the transmission of the response signal of each of the communication devices based on the reception result of the response signal by the first reception unit, and
a second storage unit for storing the priority determined by the priority determining unit; and
the first transmission unit transmits the request signal including the priority stored in the second storage unit.

9. A method of controlling a control system including a control device provided in a vehicle that performs a control of a predetermined process, and a plurality of portable communication devices for communicating with the control device;
the method comprising steps performed by the control device of:
transmitting a request signal requesting for transmission of a response signal to at least one of the plurality of portable communication devices,
receiving the response signal transmitted through a predetermined procedure from at least one of the plurality of portable communication devices in response to the transmitted request signal,
performing authentication of at least one of the plurality of portable communication devices using identification information of at least one of the plurality of portable communication devices contained in the received response signal and identification information of at least one of the plurality of portable communication devices registered in advance, and
executing the predetermined process when the authentication of at least one of the plurality of portable communication devices is successful; and
the method comprising steps performed by each of the portable communication devices of:
receiving the request signal transmitted by the control device,
performing a first transmission operation of transmitting the response signal corresponding to the received request signal to the control device at a time common with the other portable communication devices after receipt of the request signal, and
performing a second transmission operation of transmitting the response signal to the control device at a time different from times assigned to other portable communication devices after completion of the first transmission operation based on transmission scheduled time information indicating a time scheduled to transmit the response signal assigned to at least one of the plurality of portable communication devices.

10. A portable communication device of a plurality of portable communication devices for communicating with a control device provided in a vehicle that performs a control of a predetermined process, comprising:
a storage unit for storing transmission scheduled time information indicating a time scheduled to transmit a response signal corresponding to a request signal transmitted by the control device assigned to the portable communication device;
a reception unit for receiving the request signal transmitted by the control device; and
a transmission unit for performing a first transmission operation of transmitting the response signal corresponding to the request signal received by the reception unit to the control device at a time common with the other portable communication devices after receipt of the request signal, and a second transmission operation of transmitting the response signal to the control device at a time different from times assigned to other portable communication devices after completion of the first transmission operation based on the transmission scheduled time information stored in the storage unit.

11. The communication device according to claim 10, further comprising:
a timing unit for performing a timing process of measuring time and specifying current time; and
the transmission unit transmits the response signal after elapse of a predetermined time from when the request signal is received by the reception unit based on the timing process by the timing unit.

12. The communication device according to claim 10, wherein the transmission unit performs transmission of the response signal twice at a time different from the times assigned to the other communication devices based on the transmission scheduled time information stored in the storage unit.

13. The communication device according to claim 10, wherein the transmission unit performs a first transmission of the response signal at a time corresponding to the request signal received by the reception unit of a plurality of times common with the other communication devices, and performs a second transmission of the response signal at a time different from the times assigned to the other communication devices based on the transmission scheduled time information stored in the storage unit.

14. The communication device according to claim 10, further comprising:

a time setting unit for setting a time for the transmission unit to transmit the response signal based on the transmission scheduled time information stored in the storage unit and information indicating priority in the transmission of the response signal contained in the request signal received by the reception unit.

* * * * *